United States Patent
Banks et al.

(10) Patent No.: US 6,859,527 B1
(45) Date of Patent: Feb. 22, 2005

(54) COMMUNICATIONS ARRANGEMENT AND METHOD USING SERVICE SYSTEM TO FACILITATE THE ESTABLISHMENT OF END-TO-END COMMUNICATION OVER A NETWORK

(75) Inventors: David Banks, Bristol (GB); Anthony J. Wiley, Bristol (GB); Enrico Fedrigo, Castelfranco Veneto Tv (IT)

(73) Assignee: Hewlett Packard/Limited, Palo Alto, CA (US)

( * ) Notice: Subject to any disclaimer, the term of this patent is extended or adjusted under 35 U.S.C. 154(b) by 0 days.

(21) Appl. No.: 09/561,601

(22) Filed: Apr. 27, 2000

Related U.S. Application Data

(63) Continuation-in-part of application No. 09/303,395, filed on Apr. 30, 1999, now Pat. No. 6,526,131.

(30) Foreign Application Priority Data

Jan. 18, 2000 (GB) .............................. 0001027

(51) Int. Cl.[7] .......................... H04M 11/00; H04M 3/00; H04M 5/00; H04L 12/66
(52) U.S. Cl. .................. 379/106.03; 379/242; 370/352
(58) Field of Search ........................... 379/242, 106.03; 370/352

(56) References Cited

U.S. PATENT DOCUMENTS

| | | | |
|---|---|---|---|
| 4,001,509 A | 1/1977 | McDonald et al. | |
| 5,434,911 A | 7/1995 | Gray et al. | 379/106 |
| 5,454,031 A | 9/1995 | Gray et al. | |
| 5,455,687 A | 10/1995 | Fukui et al. | |
| 5,995,601 A * | 11/1999 | Garland et al. | 379/106.03 |
| 6,161,123 A | 12/2000 | Renouard et al. | |
| 6,192,044 B1 * | 2/2001 | Mack | 370/352 |

FOREIGN PATENT DOCUMENTS

| | | |
|---|---|---|
| EP | 0163577 A2 | 12/1985 |
| GB | 2337671 A | 11/1999 |
| WO | WO 99/26529 | 6/1998 |
| WO | WO 99/30262 | 6/1999 |

OTHER PUBLICATIONS

Park, Wireless Internet access of the visited mobile ISP subscriber on GPRS/UMTS network, Consumer Electronics, IEEE Transactions on, vol. 49, Issue 1, Feb. 2003, pp. 100–106.

Caswell et al., Using service models for management of Internet services, Selected Areas in Communications, IEEE Journal on, vol. 19, Issue 5, May 2000, pp. 686–701.

Juutilanen eta l., Evaluation of a next generation public wireless multi–ISP network, Local Computer Networks, 2002, LCN 2002, 27th Annual IEEE Conference on, Nov. 6–8, 2002 pp. 405–414.

* cited by examiner

Primary Examiner—Ahmad F. Matar
Assistant Examiner—Thjuan P. Knowlin

(57) ABSTRACT

An internet-connected service system is provided for facilitating communication across the internet between image-sending and image-receiving systems that have dial-up internet access. The image-sending system, after connecting to the internet, sends a communication request to the service system and the latter is then responsible for waking up the image-receiving system. Upon being woken up, the image-receiving system connects to the internet and contacts the service system. The service system then transfers the current network address of at least one of the systems to the other thereby enabling direct communication to be established between the image-sending and image-receiving systems.

15 Claims, 11 Drawing Sheets

| Initial Master Address Book | |
|---|---|
| CB Name | CB Friendly Name |
| XXX123 | Mum |
| XXX124 | Phil |
| XXX156 | Lyv |
| XXX897 | Daniel |
| XXX898 | Luis |
| XXX645 | Uncle Tom |
| XXX765 | Uncle Ted |

Line 1
Line 2
Line 3
Line 4
Line 5
Line 6
Line 7

Figure 14A

| Current CSS Address Book | |
|---|---|
| CB Name | CB Fr. Name |
| XXX123 | Mum |
| XXX124 | Paul |
| XXX156 | Lyv |
| XXX897 | Daniel |
| XXX645 | UncleTom |

| CB Address Book | |
|---|---|
| CB Name | CB Fr. Name |
| XXX123 | Mum |
| XXX124 | Phil |
| XXX897 | Daniel |
| XXX156 | Lyv |
| XXX765 | UncleTeddy |

Figure 14B

| Differences | | |
|---|---|---|
| CBName | Operation | By |
| XXX124 | modified | CSS |
| XXX156 | moved | CB |
| XXX898 | deleted | CSS |
| XXX898 | deleted | CB |
| XXX645 | deleted | CB |
| XXX765 | deleted | CSS |
| XXX765 | modified | CB |

Figure 14C

| Final Master Address Book | |
|---|---|
| CB Name | CB Friendly Name |
| XXX123 | Mum |
| XXX124 | Paul |
| XXX897 | Daniel |
| XXX156 | Lyv |

Figure 14D

COMMUNICATIONS ARRANGEMENT AND METHOD USING SERVICE SYSTEM TO FACILITATE THE ESTABLISHMENT OF END-TO-END COMMUNICATION OVER A NETWORK

CROSS REFERENCE TO RELATED APPLICATIONS

The present application is a Continuation-in-Part of U.S. patent application Ser. No. 09/303,395 filed on Apr. 30, 1999 now U.S. Pat. No. 6,526,131 and claims priority of United Kingdom Patent Application No. 0001027.2 filed on Jan. 18, 2000.

FIELD OF THE INVENTION

The present invention relates to a communications arrangement and method using a network service system to facilitate the establishment of communication over a network between image sending and receiving systems.

BACKGROUND OF THE INVENTION

Very many users of the Internet have only dial-up access through a local ISP (Internet Access Provider). Typically a dial-up user will be dynamically assigned a network address at each connection from a pool of available addresses kept by the user's ISP, the assigned address only being valid for the current connection and then being returned to the address pool. This arrangement presents certain difficulties when two such dial-up access users wish to communicate directly with each other over the internet as some means must be found of informing each other of their current network addresses. One known solution is to arrange for a user to register their current address at a meeting point (a service system) on the internet enabling gother users to go to that point and find out the current address of the first-mentioned user.

Another difficulty faced by a dial-up access internet user when seeking to contact anther such user is that the latter will frequently not be currently connected to the internet. The target user therefore needs to be woken up—one way of doing this is, of course, simply to call the target user over the telephone requesting that the user connects to the internet. The concept of wakeup calls for waking up communication equipment is well known; an example of use of a wakeup call to prompt communication initiation, is disclosed in U.S. Pat. No. 5,434,911 in relation to the remote reading of a utility meter by the utility company. The meter is connected to a normal telephone line and the utility company can wake up the meter by making a call to that line and allowing it to ring 16 times; the meter recognises such a call as an instruction to send a meter reading to the utility company and this it does by calling back the utility company at a predetermined time and transmitting the required data.

It is also known to remotely wakeup a computer to initiate the set up of IP-based (Internet Protocol based) communication with it. In this case, the computer is connected to a dedicated telephone line via a modem. A user wishing to wake up the computer calls the computer and upon the latter answering, hangs up. The computer now calls a local internet access provider (IAP) and establishes a connection to the Internet. Next, the computer sends an e-mail to the user at a fixed EP address; this e-mail will contain the current IP address dynamically assigned to the computer by the IAP thereby enabling the user to send messages back to the computer. In a refinement, caller ID information is provided to the computer with the initial call and this information is used to determine which of several fixed IP addresses is called back by the computer.

It is an object of the present invention to provide a communications arrangement and method in which a service system facilitates the establishment of communication between two end users by providing both wake-up and address communication functions.

SUMMARY OF THE INVENTION

According to one aspect of the present invention, there is provided a communications arrangement comprising a communications infrastructure including a data network and access network means providing connection to the data network through data-network access points, a plurality of end systems connected to the access network means, and a service system connected to the data network for facilitating communication between the end systems over the data network via the access network means and data-network access points; the plurality of end systems including:

a first end system comprising an image sending device, and a first connectivity entity connected to the image sending device and the access network means for establishing, in cooperation with a corresponding entity in a selected receiving end system, a connection passing through the data network for the image sending device to send an image to the selected receiving end system, the first connectivity entity including request means for sending a request to the service system to facilitate the establishment of communication between the first end system and the selected end system; and a second end system comprising an image receiving device and a second connectivity entity connected to the image receiving device and said access network means for establishing, in cooperation with a corresponding entity in a sending end system, a connection passing through the communications infrastructure for the image receiving device to receive an image from the sending end system, the second connectivity entity including response means for responding to a wakeup indicator received from the service system by connecting to the data network and communicating with the service system;

the service system including first means responsive to a said request from the first end system indicating that it wishes to communicate with the second end system, to send a wakeup indicator to the second end system, and second means responsive to being contacted by the second end system as a result of receiving said wakeup indicator, for enabling the first and second end systems to communicate directly with each other across the data network.

According to another aspect of the present invention, there is provided a method of initiating communication over a data network between a first end system and a second end system using the services of an intermediary system connected to the network at a known address, at least the second of the end systems being connectable to the network through a network access service that provides access to the network for that end system with an address that is independently assigned each time connection to the network is established; the method comprising the steps of:

(a)—passing from the first end system, over the network, to the intermediary system, a network address through which the first end system can be contacted, (b)—passing from the first end system, over the network, to the intermediary system, an indication that the first end system wishes to communicate with the second end system;

(c)—in response to receipt of said indication at the intermediary system, sending a wake-up indicator to the second end system;

(d)—in response to receipt of the wake-up indicator at the second end system, establishing a data connection between the second end system and the intermediary system through the network access service, and informing the intermediary system of the network address of the second end system; and (e)—passing from the intermediary system, over the network, to one of the end system, the network address of the other end system, and passing the network address of said one end system, from said one end system or the intermediary system to the said other end system whereby the end systems, knowing each others network addresses, can inter-communicate.

BRIEF DESCRIPTION OF THE DRAWINGS

A communications method and arrangement embodying the invention will now be described, by way of non-limiting example, with reference to the accompanying diagrammatic drawings, in which:

FIG. 14 is an example illustrating the handling of address-book contents during a FIG. 13 merge operation.

BEST MODE OF CARRYING OUT THE INVENTION

Figure 1:
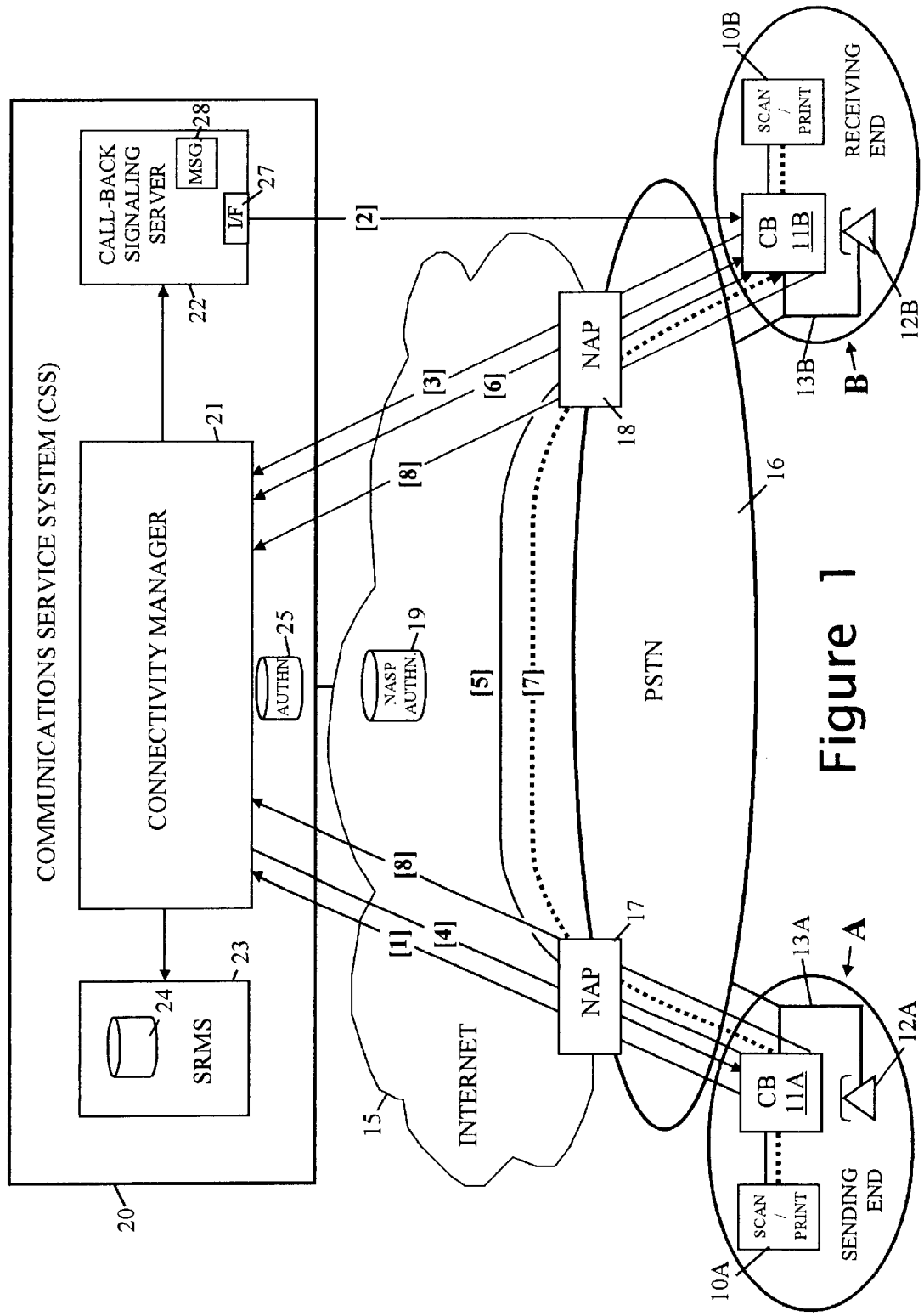
FIG. 1 is a diagram illustrating the overall form and operation of the communications arrangement and showing two end systems placed in communication with the aid of services provided by a communications service system.

FIG. 1 shows an arrangement by which two end systems A, B (for example, at domestic premises) can be set up to communicate with each other over the internet 15 or other packet switched data network. In the present case, both end systems A and B have internet access via dialup connections through the public switched telephone network PSTN 16.

For ease of description, both end systems A and B are shown as having the same items of equipment and the same reference numbers are used for corresponding items in the two end systems, suffixed by A or B as appropriate to indicate the end system concerned where it is desirable to make this distinction. More particularly, each end system A, B comprises a standard analogue-line telephone installation with telephone line 13A, 13B and telephone 12A, 12B; a combined scanner/printer device 10A, 10B; and a connectivity box 11A, 11B connected between the telephone line 13 and scanner/printer device 10. The connectivity boxes 11A, 11B are responsible for establishing a communication channel across the internet to enable the devices 10A, 10B to exchange data. Each connectivity box includes an electronic address book enabling a user to specify the end system with which it is desired to communicate.

In the following description, it will be assumed that the user of end system A (user A), wishes to send a drawing to the user of end system B (user B); in other words, the drawing is to be scanned in by device 10A, sent over the internet 15 from end system A to end system B, and printed out by device 10B. In this context, end system A is the sender system and end system B the receiver system and use of the terms "sender" and "receiver" below are to be interpreted accordingly. However, it should be understood that once communication has been established between the end systems A and B, data flow can be in either or both directions and designating end system A as the sender and end system B as the receiver is merely done to facilitate description of the FIG. 1 arrangement.

The connectivity box (CB) 11A of end system A can connect to the internet 15 or other IP network through the local Network Access Point (NAP) 17 of a network access service provider (NASP), CB 11A establishing a dialup connection through the PSTN with NAP 17 and using PPP ("Point to Point Protocol") to enable IP packets to be transferred to/from CB 11A. Similarly, CB 11B can connect to its local NAP 18 over a PPP link to gain internet access. As is well known, dialup internet access achieved through local NAPs generally involves the dynamic assignment of EP addresses to the end system concerned in terms of its presence on the internet. In other words, each NAP 17,18 will assign the end system A, B respectively an IP address taken from its respective pool of addresses at the time that internet access is required, this address being returned to the pool once the access session is terminated. There will generally be no relation between the IP addresses assigned to an end system from one internet access session to the next.

In the present arrangement, it is assumed that the same NASP controls both NAP 17 and NAP 18. This NASP runs an authentication server 19 for authenticating users by username and password (for example, in accordance with the RADIUS standard—see I.E.T.F. RFCs 2138 & 2139). It is also possible for each NAP 17,18 to be controlled by a different NASP, with each NASP running its own authentication server for authenticating users.

User A, who may be quite unaccustomed to technical devices, faces two main problems when wanting to send a drawing to user B. Firstly, end system B will generally not be connected to the Internet at that moment, and secondly, neither end system knows a priori the IP address of the other because these addresses are dynamically assigned at connection time. To facilitate the initiation of communication between end systems A and B, an intermediary is provided in the form of communications service system (CSS) 20 which has a permanent internet presence at a known IP address and port number. CSS 20 provides its connectivity services to its subscribers (end system users who have gone through a registration and CB configuration process).

CSS 20 comprises a connectivity manager 21 for exchanging messages with the end systems A and B over the internet, a call-back signalling server (CBSS) 22 by means of which the connectivity manager 21 can wake up an end system that is not currently connected to the internet, and a subscriber record management system (SRMS) 23 connected to the connectivity manager 21 and including a customer database 24 holding subscriber details such as name, street address, and billing data. The CSS 20 also has its own authentication server 25 that communicates with the NASP authentication server 19. The connectivity manager 21 includes a database giving, for each subscriber, operational details including a globally-unique identifier ("CB ID") and a globally-unique name ("CB NAME") for the subscriber, the subscriber's telephone number, and any rules a subscriber may specify limiting who should be allowed to contact them and the times of day when communications are permitted. The CB ID and CB Name are "globally unique" with respect to the current communications arrangement including all its subscribers. The association of both a CB ID and CB Name with each subscriber is done for design flexibility; in the present embodiment there is a one-to-one correspondence between CB ID and CB Name and the connectivity manager includes a table linking the two for each subscriber. The CB ID may be considered more fundamental in that if the subscriber changes their CB Name, the CB ID will remain the same.

It may be noted that the entity running CSS 20 and providing the connectivity service (the "connectivity service provider" CSP), will generally have contracted with the NASP running the NAPs 17, 18 for internet access and bandwidth resources so that the end users A and B need not separately contract with NASP in addition to their service contracts with the CSP. In this case, the CSP will wish to meter data transfer between its subscribers even though, as will be seen, the data being transferred does not pass through the communications service system CSS 20.

The general operation of the FIG. 1 arrangement is as follows:

[1]—User A puts a drawing to be sent in the scanner of device 10A, selects user B from the address book in CB 11A, and presses a "send" button on CB 11A. CB 11A dials NAP 17 to get internet access (this process includes user authorisation) and then connects to CSS 20 and informs the connectivity manager 21 that end system A wishes to send data to user B.

[2]—Connectivity manager 21 looks up the operational details of user B to determine if B is willing to receive communications from user A at the current time. Assuming this check is passed, connectivity manager 21 now passes the telephone number of user B to the call-back signalling server 22 which makes a wakeup telephone call to end system B.

[3]In a manner to be described hereinafter, CB 11B recognises the wakeup call without answering it. CB 11B then calls its NAP 18 and establishes internet access (again, this involves authorisation). CB 11B next connects to CSS 20 and informs the connectivity manager 21 that end system B is now on line.

[4]—Connectivity manager 21 by this time knows the current IP addresses of both end systems and proceeds to tell CB 11A the IP address for reaching end system B. It also tells CB 11A the job number that the connectivity manager has allotted to this transfer between end systems A and B.

[5]—CB 11A now sends a message direct to CB 11B over the internet to set up a data transfer; this message includes the job number as well as the IP address of end system A.

[6]—CB 11B, on receiving the data-transfer message from CB 11A, verifies with the connectivity manager 21 that the parameters sent to it by CB 11A (job number and IP address) are as expected before proceeding further with the data transfer.

[7]—Data transfer is then initiated with the drawing to be sent being scanned in and data sent from device 10A, through CB 11A, NAP 17, the internet 15, NAP 18, and CB 11B, to device 10B where the drawing is printed out. This data transfer is shown by the bold dotted line in FIG. 1.

[8]—When data transfer is complete, both end systems A,B send metering data (for example, number of pages or bytes sent/received) to connectivity manager 21 which instructs SRMS 23 to record this information against the job number in the billing record of user A and/or B. Thereafter, both end systems disconnect from the connectivity manager 21 and terminate their internet accesses.

It will be appreciated that the foregoing does not identify all messages exchanged and a more detailed description of the messages exchanged will be given hereinafter with reference to FIG. 10. Furthermore, instead of waiting for communication to be established between the end systems before the sending end system scan in the drawing to be sent, this drawing may be scanned into memory immediately the "send" button is pressed and prior to the CB 11A dialling NAP 17.

Connectivity Box

Figure 2:
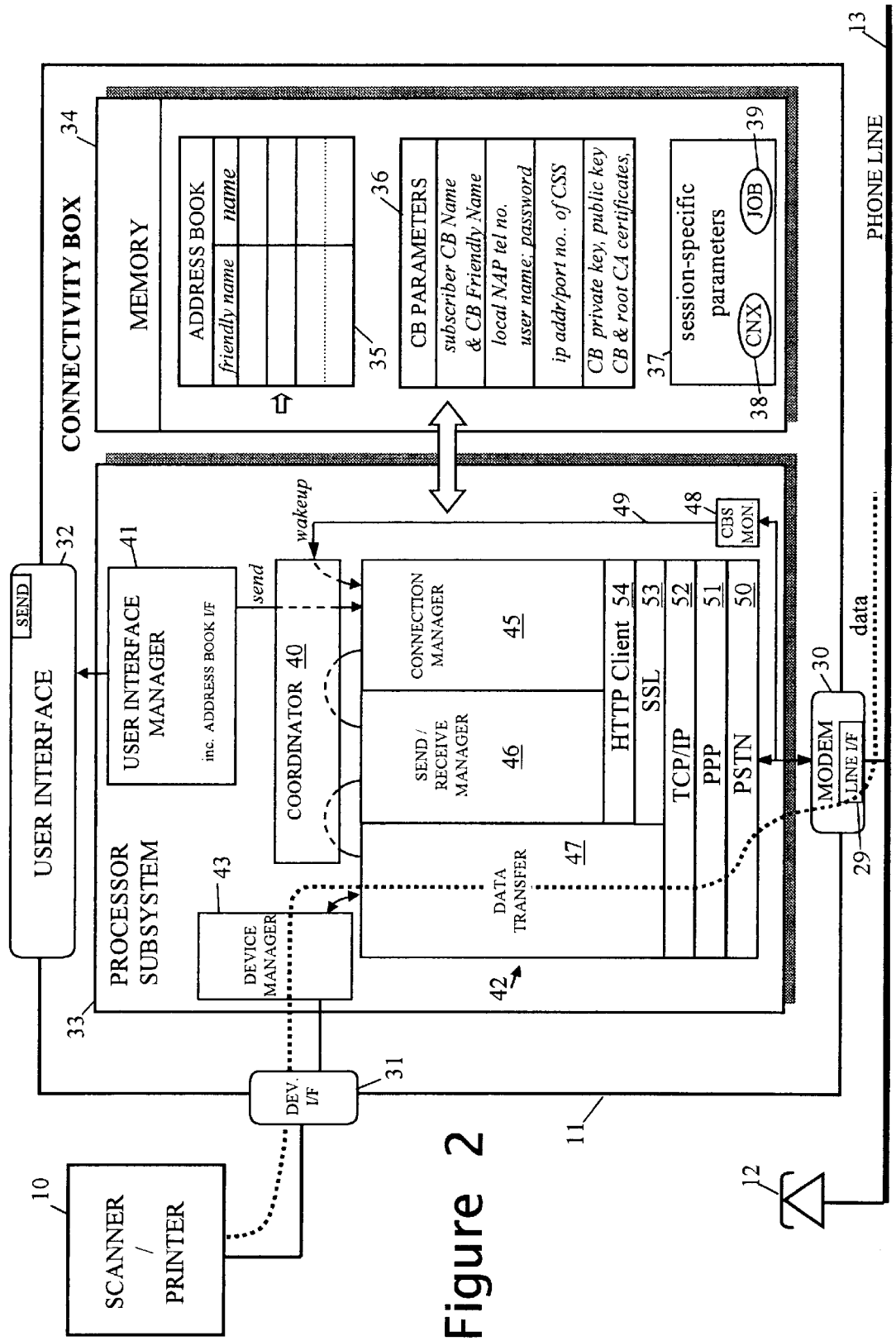
FIG. 2 is a functional block diagram of a connectivity box provided in each end system of FIG. 1.

FIG. 2 illustrates the form of the connectivity boxes 11. CB 11 has three external interfaces, namely modem 30 providing an interface to telephone line 13 through line interface circuitry 29, peripheral connect interface 31 (for example, a USB interface) providing connection to device 10, and user interface 32 comprising an LCD display panel and keypad (including a "send" button). Internally, CB 11 is constituted by a processor-based system formed by a processor subsystem 33 and memory 34 (the memory 34 will generally be formed by a combination of volatile and non-volatile memory modules, the latter comprising, for example, flash memory used for updateable firmware, address book entries, and configuration and other parameters).

Memory 34 stores an address book 35 listing other subscribers that a user may want to contact. Each such other subscriber is listed by a friendly name (referred to as the "CB Friendly Name") such as "Uncle Jo", and their corresponding globally-unique CB Name such as "jo12345678". A user may select a party to send to by using the user interface 32 to browse the address book in terms of the CB Friendly Names. The contents of the address book are also held by the connectivity manager 21. How the address book of CB 11 and connectivity manager 21 are coordinated on an on-going basis will be described hereinafter.

Memory 34 also stores several CB parameters 36 which are either fixed or only likely to change infrequently. These parameters include:
- the globally-unique CB name (and possibly also the CB Friendly name) of the subscriber;
- telephone number of local NAP, and user name and password for authentication when establishing internet access through that NAP;
- IP address and port number of CSS 20;
- encryption data for establishing secure communication with CSS 20—in the present embodiment SSL is used and the encryption data comprises CB private key and public keys, a certificate linking the CB public key with the subscriber CB ID (this certificate being signed by an appropriate root certificate authority CA which may be the CSS itself), and a certificate for the root CA.

Memory 34 also stores a number of parameters that are primarily only relevant to a current session of communication. These parameters 37 include the IP address assigned to the CB for the current internet access session, the status of the connection between the CB and the connectivity manager 21, the job number allocated by the CSS 20 for the current data transfer, and the IP address of the remote end system and name of the associated user. In fact, both the status of the connection to the connectivity manager 21, and the status of the data-transfer job can conveniently be tracked in the CB by storing, on an on-going basis, corresponding connection and job items 38, 39 that respectively hold the current state of the connection and job (this state being "idle" when the CB is inactive) and related parameters.

The processor subsystem 33 provides, under program control, specific functionality represented in FIG. 2 by:
- a coordinator entity 40 for coordinating the operation of the other functions,
- user interface manager 41 for monitoring and controlling the user interface 32 to permit a user to select an intended receiving party by the user-friendly CB Friendly Name from the address book, then to initiate sending by appropriately prompting the coordinator 40,
- a protocol stack 42 for controlling communication setup and data transfer through the modem 30, each protocol layer of the stack implementing the message formats and behaviours defined by the corresponding protocol specification (the behaviours being generally defined in terms of state machines),
- device interface manager 43 for managing data transfer to/from the device 10, and
- a call-back signalling (CBS) monitor 48 for monitoring telephone line 13 via the modem 30 to determine receipt of a wakeup call, the monitor 48 informing coordinator 40 when such a call is detected.

The protocol stack 42 comprises three application-level protocol layers 45–47 running on top of basic communication protocol layers. These basic communication protocol layers comprise a PSTN layer 50 for controlling the modem 30 to make calls over the telephone line 13 to NAP 17/18, a PPP layer 51 for establishing a mechanism for IP packet exchange over the phone line with the NAP 17/18, a TCP/IP layer 52 for providing reliable transport and network services, an SSL layer 53 for secure communication with the CSS 20, and an HTTP Client layer 54 for carrying application layer transaction messages in HTTP messages.

The three illustrated application-level protocol layers are a connection manager protocol layer 45 (referred to below as the connection manager 45), a send/receive manager protocol layer 46 (referred to below as the send/receive manager 46), and a data transfer protocol layer 47. The connection manager 45 and send/receive manager 46 each sit on top of the HTTP and SSL layers 54, 53 and effect secure transactions with peer protocol layers at the connectivity manager 21 of the CSS 20, each transaction being in the form of a request message and a corresponding response message with each request being carried in an HTTP POST/GET message addressed to a URL specific to the transaction type.

Figure 3:
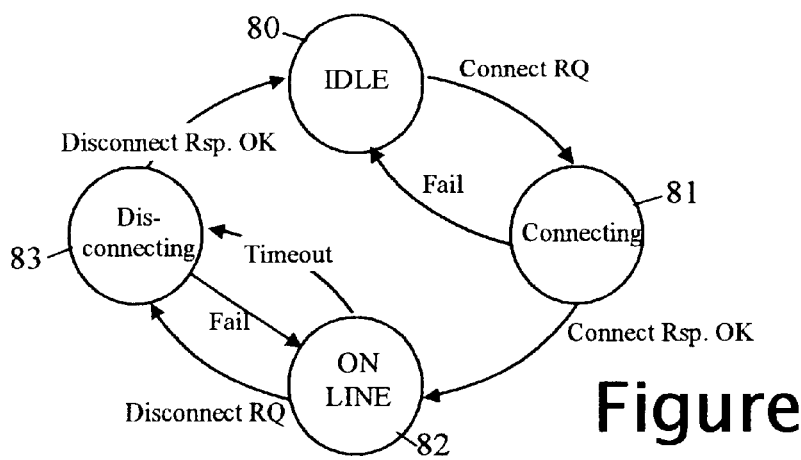
FIG. 3 is a state machine illustrating the behaviour of a connection manager of the FIG. 2 connectivity box.

The connection manager 45 manages, at the CB, the setting up and termination of a connection between the CB and the connectivity manager 21, the status of this connection being stored in memory item 38 and used as state information for the connection manager 45. The main transactions of the connection manager protocol are CONNECT and DISCONNECT. The connection manager 45 operates in accordance with the FIG. 3 connection state machine, the four states of which represent the possible states of the connection between the CB and connectivity manager 21. More particularly, when the CB is inactive, the connection state is "Idle" (state 80); if now the connection manager 45 is triggered to set up a communication channel to the connectivity manager 21, it sends a CONNECT Request to the latter and the connection state machine thereupon transits to a Connecting state 81. It will be appreciated that the issuing of a CONNECT Request by the connectivity manager 45 causes the lower layers of stack 42 to take all the necessary steps to dial NAP 17/18, establish a PPP link, and set up a secure link over the internet with CSS 20 over which the CONNECT Request can be passed to the connectivity manager 21. During this process of setting up a secure link, the identity of the sending end system is reliably established in terms of its CB ID (this involves the certificate that links the CB public key with the CB ID) so that identity of the sending end system does not need to be included—and for security reasons should not be included—in the CONNECT Request itself. The IP address of the sending end system is, of course, passed to the CSS in the process of setting up the secure link between the CB and CSS.

In due course, the connection manager 45 receives a CONNECT Response which will indicate whether or not a subscriber-service connection with the connectivity manager 21 has been granted; if a connection is granted, the "On Line" state 82 is entered and otherwise the Idle state 80 is re-entered. The next change results either from the connection manager 45 sending a DISCONNECT Request to the connectivity manager 21 in response to job termination, or from the expiry of a timeout period; in both cases, the Disconnecting state 83 is now entered. If a DISCONNECT Response is then received back from the connectivity manager 21 confirming the disconnection, the idle state 80 is re-entered; however, if the DISCONNECT Response does not confirm disconnection, the On-Line state 82 is resumed. The expiry of the timeout period may, in fact, be arranged to force a disconnection, in which case the connection state moves directly from On Line back to IDLE.

Figure 4:
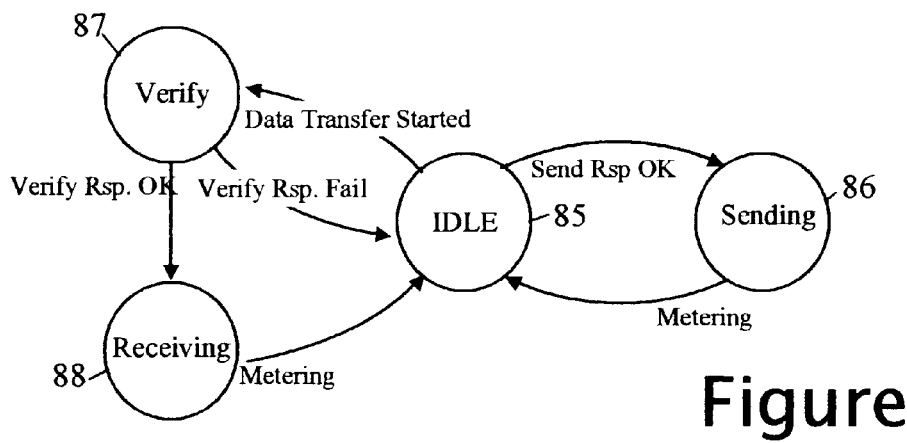
FIG. 4 is a state machine illustrating the behaviour of a send/receive manager of the FIG. 2 connectivity box.

The send/receive manager 46 is involved in the initiation of contact between the end systems and the metering of the data transfer between these systems; the main transactions of the protocol 46 are SEND (used by the sending system), VERIFY (used by the receiving system) and METERING. The send/receive manager 46 is intimately concerned with the progress of the current "job" as identified by the job number supplied by the CSS 20, the status of the job being stored in memory item 39 and used as state information for the send/receive manager 46. The send/receive manager 46 operates in accordance with the FIG. 4 connection state machine, the four states of which represent the possible states of the data transfer job being handled by the CB. More particularly, when the CB is inactive, the state of the data-transfer job is Idle (state 85). If now a user initiates a data transfer session (so that the CB is in a sending system), the send/receive manager 46 will, upon establishment of a connection with the connectivity manager 21, issue a SEND Request containing the globally-unique CB Name of the intended receiving party. If the SEND Response received back from the connectivity manager 21 gives the go ahead to proceed with the data transfer, the job is set in a Sending state 86. A positive SEND Response includes the IP address of the receiving end system and the job number. At the end of data transfer, the send/receive manager sends a METERING message (no response expected) to the connectivity manager 21 with metering data, this message also indicating whether the data transfer was successful. The state of the job transits from its Sending state 86 back to its Idle state 85.

It is also possible for the send/receive manager to send interim METERING messages 20 during the course of data transfer and, in this case, the message does not include an indication regarding whether or not the data transfer was successful and the job remains in its Sending state 86.

Where the CB is part of the receiving end system, the state of the job at the CB transits from the Idle state 85 to a Verify state 87 upon receipt by the CB of the first data transfer message (a transfer set up message including the allocated job number) from the sending end system. In the verify state, the send/receive manager 46 exchanges VERIFY Request and Response messages with the connectivity manager 21 to check the IP address of the sending system and job number are as expected; the job state will pass to Receiving (state 88) if the data transfer is confirmed by the connectivity manager, otherwise the Idle state is re-entered. When the job is in its Receiving state, the send/receive manager 46 effects one or more METERING transactions with the connectivity manager 21, the last of these transactions changing the job state back to Idle (state 85).

The data transfer protocol layer 47 sits on top of the TCP/IP layer and is responsible for data transfer with its peer in the remote CB. The data transfer protocol layer 47 communicates with the device interface manager 43 to control the flow of data through the CB to/from the device 10. The path taken by data being transferred to/from the device 10 is illustrated by the bold dotted line in FIG. 2. As already noted, the drawing (or other item) to be sent, may be scanned in and stored in memory (memory 34) as a first step of the sending operation—in this case, the data transfer path is, of course, different to that shown in FIG. 2. Any suitable data transfer protocol can be used and further description will not be given herein.

Figure 5:
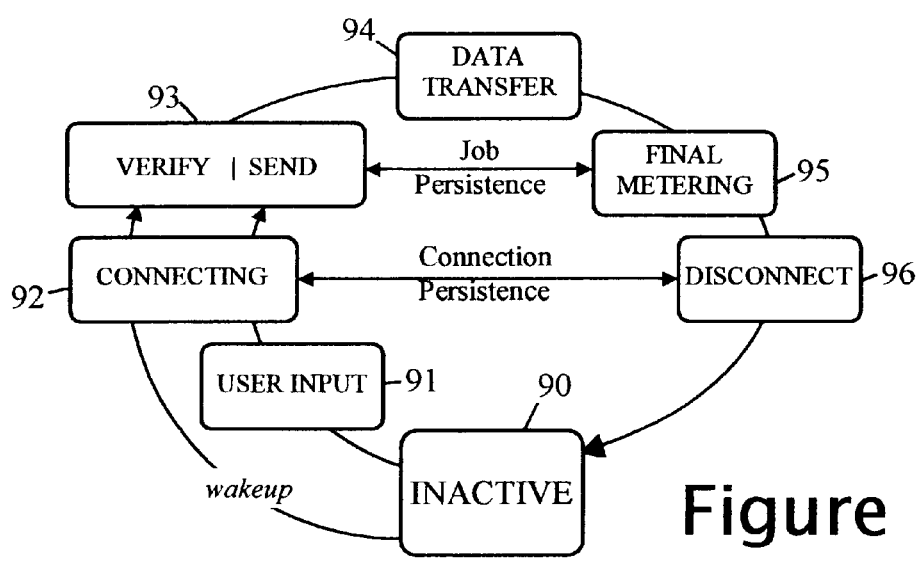
FIG. 5 is a diagram of the main operational phases of the FIG. 2 connectivity box.

Having described individually the main elements of the CB 11, the operating phases of the CB 11 as a whole will now be described with reference to FIG. 5 for the case of successful connection and data transfer between end systems (it should be noted that these phases are not "states" of the CB 11 as such). Starting from an inactive condition 90 of the CB 11 (both the connection and job being in their Idle states), the coordinator 40 causes the connection manager 45 to initiate a connection with the CSS 20 (phase 92) as a result of either:

a user selecting a receiving party using the user interface 32 (phase 91) to access the address book 35 with the aid of the interface manager 41, and pressing "send"—in this case, the CB is part of the sending end system; or the CBS monitor 48 recognising a wakeup call—in this case, the CB is part of the receiving end system.

After a connection to the CSS 20 is established, the CB 11 will next enter the send/verify phase 93. Where the CB 11 is part of the sending system, this happens immediately the connection to the CSS 20 is established as a result of the connection manager 45 informing the coordinator 40 of connection establishment and the latter, knowing it is part of the sending system, signalling to the send/receive manager 46 to make a send request to the connectivity manager 21 of the CSS 20. The send request identifies the intended recipient by globally-unique CB Name, the latter being derived from the CB Friendly Name selected by user A by reference to the address book 35. Where the CB 11 is part of the receiving system, the coordinator 40 does not trigger action by send/receive manager 46,—instead the send/receive manager is only brought into action when a data transfer request is received by the data transfer protocol layer 47 and the latter passes the job number received in that request to the send/receive manager 46 (directly or via coordinator 40). In this case, the manager 46 proceeds to verify that the data transfer request is expected by means of a verify transaction exchanged with the connectivity manager 21.

Following the send/verify phase 93, data transfer takes place in accordance with the data transfer protocol 47 (phase 94). When data transfer is complete, the data transfer protocol layer informs coordinator 40 which prompts the send/receive manager 46 to effect a final metering transaction with the connectivity manager 21 (phase 95) and then terminates the current job (sets the job state to Idle). Once the send/receive manager 46 has terminated the current job it informs the coordinator 40 which thereupon causes the connection manager 45 to close the connection with the CSS 20 (phase 96) and the PPP session with its local NAP.

As can be seen, in the FIG. 2 connectivity box the functionality provided by the coordinator 40 is fairly straight-forward and, indeed, this functionality could be incorporated into the application protocols 45–47 themselves. However, as will be described hereinafter, the coordinator 40 can be given additional functionality to enable the CB to be provided with additional features.

Connectivity Manager

Figure 6A:
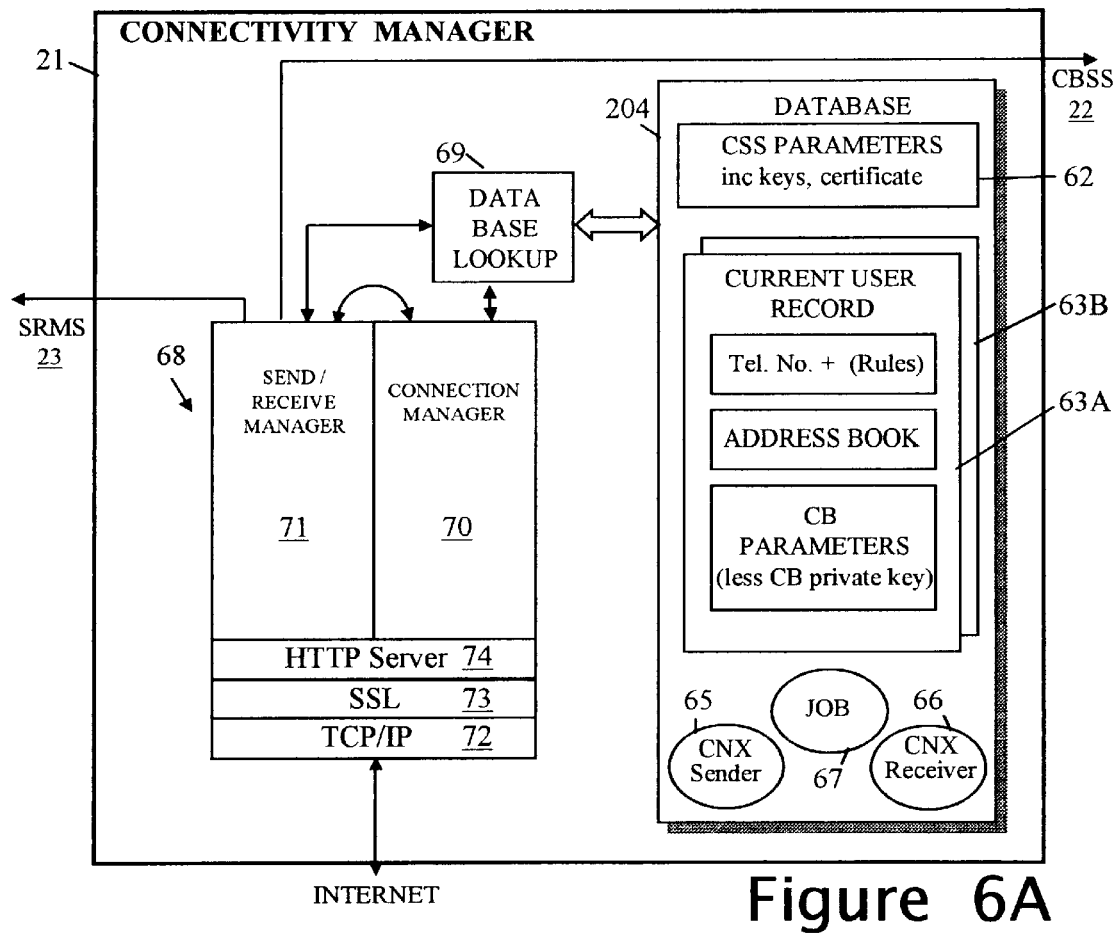
FIG. 6A is a functional block diagram of a connectivity manager provided in the communications service system of FIG. 1.

FIG. 6A is a diagram illustrating the main functional elements of the connectivity manager 21 of CSS 20. As previously noted, the connectivity manager includes a database (item 204 in FIG. 6A). Database 204 holds CSS parameters 62, subscriber records 63 holding operational information, and service-instance parameters 65–67 specific to each current service instance (in the present case, each inter-end-system communication linkup currently being managed).

The CSS parameters 62 include encryption data for establishing secure SSL based communications with subscriber end systems, this data being typically the private and public keys of the CSS 20, and a certificate linking the public key of the CSS to its identity.

Each subscriber operational record 63 held by database 204 includes:

the telephone number of the subscriber and any rules limiting who is to be allowed to transfer data to the subscriber and the times of day when data transfers can be made;

the address book of the subscriber, this address book corresponding to the one held in the subscriber's CB 11;

the CB parameters of the subscriber's CB 11 (other than the private key of the latter, unless the CSS 20 is serving as the root certificate authority).

The service-instance parameters held for each end-system to end-system linkup being managed by the connectivity manager, comprise details ("CNX sender") 65 of the connection with the sender system including its state, details ("CNX receiver") 66 of the connection with the receiver system including its state, and job details 67 including job number, job status, and related metering data. The details 65–67 of each linkup service instance are associated with the relevant subscriber records 63 and may be stored as temporary elements of those records or in data objects created and destroyed as needed by the connectivity manager 21.

As well as database 204, the connectivity manager has the following specific functionality by:

a protocol stack 68 for controlling communication setup between end systems and monitoring the related data-transfer job, each protocol layer of the stack implementing the message formats and behaviours defined by the corresponding protocol specification (the behaviours being generally defined in terms of state machines); and database lookup 69 for accessing the subscriber records 63 of current interest and other data.

The protocol stack 68 comprises two application-level protocol layers 70, 71 running on top of basic communication protocol layers. These basic communication protocol layers comprise a TCP/TP layer 72 for providing reliable transport and network services, an SSL layer 73 for secure communication with CB 11, and an HTTP Server layer 74 for carrying application layer transactions messages in HTTP messages. It will be appreciated that lower layers (not illustrated) exist below the TCP/IP layer to provide connectivity to the internet.

The two application-level protocol layers are a connection manager protocol layer 70 (connection manager 70), and a send/receive manager protocol layer 71 (send/receive manager 71). The connection manager 70 and send/receive manager 71 effect secure transactions with the corresponding protocol layers 45 and 46 respectively of the CBs 11 using HTTP messages to carry the transaction messages.

Figure 6B:
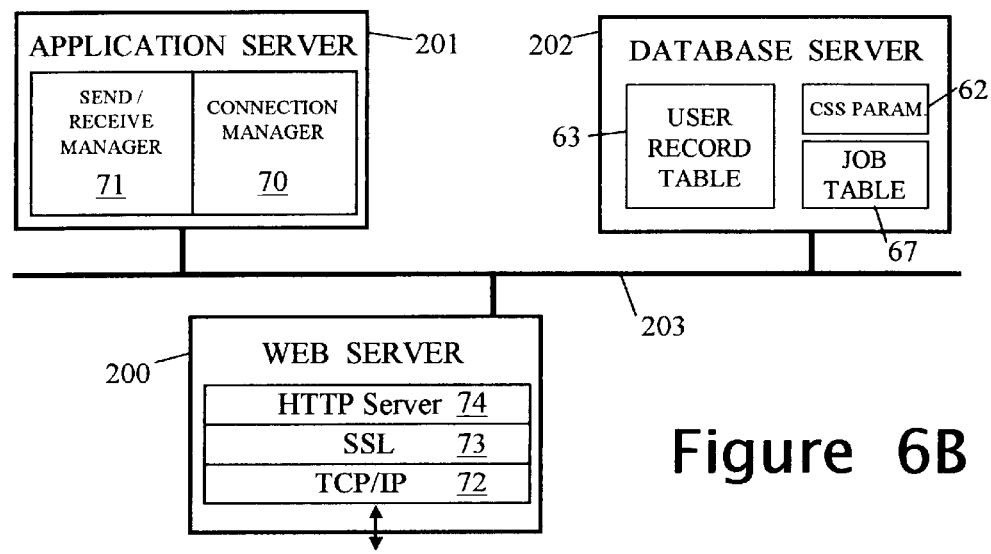
FIG. 6B illustrates a division of the functionality of the FIG. 6A connectivity manager between LAN-connected servers.

For small systems, the connectivity manager 21 may be implemented as a single processor-based system with internet connectivity. For larger systems, a server-based architecture is more suitable and FIG. 6B depicts such an implementation. More particularly, the functionality of the connectivity manager 21 is spread out between a web server 200, an applications server 201, and a database server, these servers being interconnected by a LAN 203. As illustrated, the web server implements the TCP/IP, SSL and HTTP layers 72–74, applications server 201 implements the application-level layers 70 and 71, and database server 202 implements database 204. The applications server 201 is provided with database lookup functionality 69 for querying the database server. Within the database server 202, subscriber operational details are, for example, held in a table with each subscriber record 63 forming one line of this table and including fields for the connection state parameters 65/66. The database server 202 also has a table for job data 204. Preferably, the applications server 201 handles each transaction passed to it by the web server 200 as a separate task spawning a separate thread for each. All relevant state information is held in the appropriate tables of the database server 203 enabling the application server to retrieve all needed information for each new transaction directly from the database server, any changed state information resulting from a transaction being passed back to the database server before processing of the transaction is terminated. Such an architecture facilitates scaling since large systems can be handled by using multiple web servers, application servers and database servers with appropriate means for balancing load between them; high availability/fault tolerance is also facilitated by this ability to provide multiple servers of each type.

Figure 7:
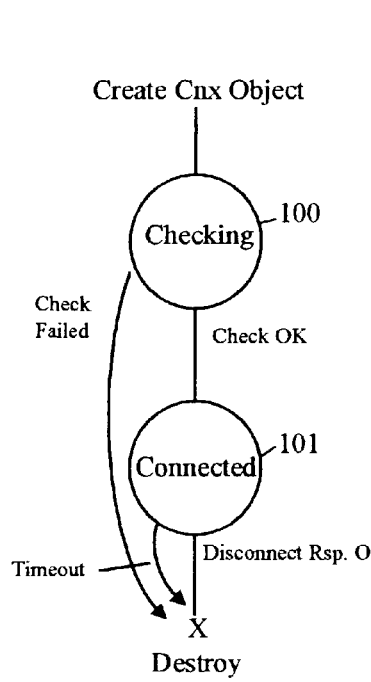
FIG. 7 is a state transition diagram illustrating the behaviour of a connection manager of the FIG. 6 connectivity manager.

The functionality of the connection manager 70 and send/receive manager 71 will now be described in more detail. The connection manager 70 manages, at the CSS, the setting up and termination of a connection between the connectivity manager 21 and a CB. As already mentioned, the main transactions of the connection manager protocol are CONNECT and DISCONNECT. FIG. 7 depicts the operation of the connection manager 70 in terms of the state of the connection between connectivity manager 21 and end-system CB, this state being held in a connection data object 65 created by the connection manager 70 upon receiving a new CONNECT Request. The initial state of the connection is Checking (state 100), this state being maintained whilst the connection manager 70 uses the lookup functionality 69 to look for the relevant end-system subscriber record 63A using the CB ID obtained by the SSL layer 73 when the end system connected to the connectivity manager. Upon the correct record being found, a determination is made as to whether the connection should be confirmed (in particular whether the end system concerned belongs to a current valid subscriber). If this check proves positive, a corresponding CONNECT response is returned to the end-system CB and the connection state is changed to Connected (state 101); however, if the check produces an unfavorable finding or if no user record is found, a fail indication is returned to the end-system CB and the connection object destroyed. For successful connections, the state Connected is maintained until either a DISCONNECT Request is received from the relevant end system prompting the return of a positive DISCONNECT Response, or a timeout expires; in both cases exit from the Connect state is followed by destruction of the connection object concerned.

Figure 8:
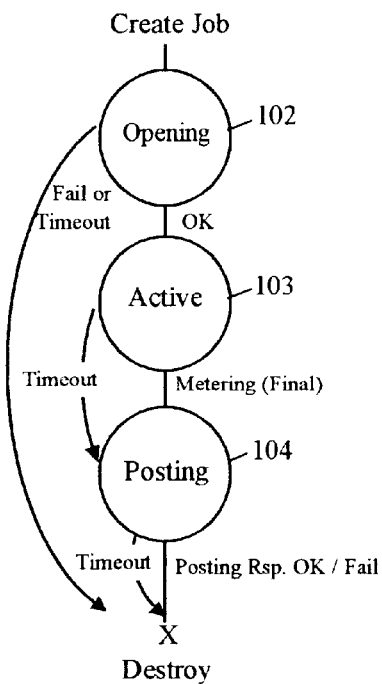
FIG. 8 is a state transition diagram illustrating the behaviour of a send/receive manager of the FIG. 6 connectivity manager.

The send/receive manager 71 is responsible for the initiation of contact between end systems to be linked up, and the metering of the data transfer between these systems; as previously noted, the main transactions of the protocol 46 are SEND (used with the sending end system), VERIFY (used with the receiving end system) and METERING. The send/receive manager 71 communicates with lookup functionality 69 to access user records, with callback signalling server 22 to initiate a wakeup call, and with the subscriber record management system 23 to download job and metering information following job completion. FIG. 8 depicts the operation of the send/receive manager 71 in terms of the state of a current job as held in a corresponding job data object 67 created by the send/receive manager 71 upon receiving a new SEND Request. The job data object also includes an indication of the sender A and intended receiving party B. The initial state of the job is Opening (state 102), this state being maintained whilst the send/receive manager 71 uses the lookup functionality 69 to look for the details of the intended receiving end-system subscriber B (as identified by the CB Name received for the sender A) in the subscriber records and determine whether the job should proceed (in particular whether the end system concerned belongs to a current valid subscriber and the rules associated with that subscriber permit the proposed data transfer). If this check fails, a negative SEND Response is returned to the end system concerned and the job data object destroyed; however, if the check gives a positive result, a check is next made as to whether the intended receiving system is currently connected (this is most readily done if the connection details 65, 66 are actually part of the subscriber records).

Where this latter check determines that the intended receiving system is not currently connected, the send/receive manager 71 asks the call-back signalling server 22 to make a wakeup call to the intended receiving end system at the telephone number held for the subscriber concerned in the subscriber record 63B. If the intended receiving system B successfully receives and recognises the wakeup call and successfully connects through to the connectivity manager 21, and if the connection manager 70 confirms the CONNECT Request sent by the receiving system B, then the send/receive manager 71 will in due course receive an indication from the connection manager 71 that a particular user B has connected to the connectivity manager 21. The send/receive manager 71 now tries to associate, through the globally-unique CB ID of the receiving subscriber B (extracted by the SSL layer during connection establishment), the newly connected user with the current jobs that are in their Opening state. Assuming a match is found, the send/receive manager 71 finally sends a positive SEND Response back to the sender end system A and transits the job to an Active state 103. The SEND Response includes the IP address of the receiving end system and the job number.

Where the check for whether the intending receiving end system is currently connected, shows this to be the case, the send/receive manager 71 will proceed directly to sending a positive SEND Response (with job number and receiver IP address) back to the sender end system A and transit the job to an Active state 103. It will be appreciated that this may result in more than one sender end system trying to initiate a data transfer operation with the receiving end system; this situation is regulated by the data transfer protocol (for example, by queuing the data transfer operation).

The job stays in its Active state during data transfer between the end systems A and B, the first step of this transfer being the sending of a transfer request from the sending end system A to the receiving end system which includes the job number allocated by the send/receive manager 71 and, of course, the IP address of the sending end system. The receiving end system next checks the job number and IP address of the sender by passing these items in a VERIFY request to the send/receive manager which checks that the indicated sending system IP address matches up with that recorded for the job concerned; assuming this is the case, the send/receive manager sends a positive VERIFY response back to the receiving end system enabling data transfer to proceed. Once data transfer is started, both end systems may effect one or more intermediate METERING transactions with the send/receive manager. The send/receive manager 71 handles the VERIFY and intermediate METERING transactions received from the related end systems A, B without changing the state of the job. When data transfer is complete, the end systems A, B both send METERING with final metering data causing the state of the job to be changed to Posting (state 104). The send/receive manager then transfers the job details (including the received metering data that has, for example, been temporarily held in the job data object) to the SRMS 23 for processing and storing in database 24. After effecting this transfer, the send/receive manager destroys the job data object.

It will be appreciated that the connectivity manager 21 is capable of managing multiple end system linkups concurrently.

With regard to the server-based implementation of FIG. 6B, each SEND transaction is handled by a corresponding application thread on the applications server 201, this thread being suspended after the CBS server 22 has been prompted to make a wakeup call; at the same time a monitor process running on the applications server is informed of the identity (CB ID) of the end system being woken up by the suspended thread. Whenever a new end-system connection is established by a connection manager application thread, it broadcasts the CB ID and the monitor process checks to see if this CB ID corresponds to one for which there is a suspended SEND transaction thread—if there is a match, the corresponding thread is resumed to send a positive SEND response. The foregoing process is similar to that described in the proceeding paragraph except that it was not necessary to refer to the job status information.

Figure 9:
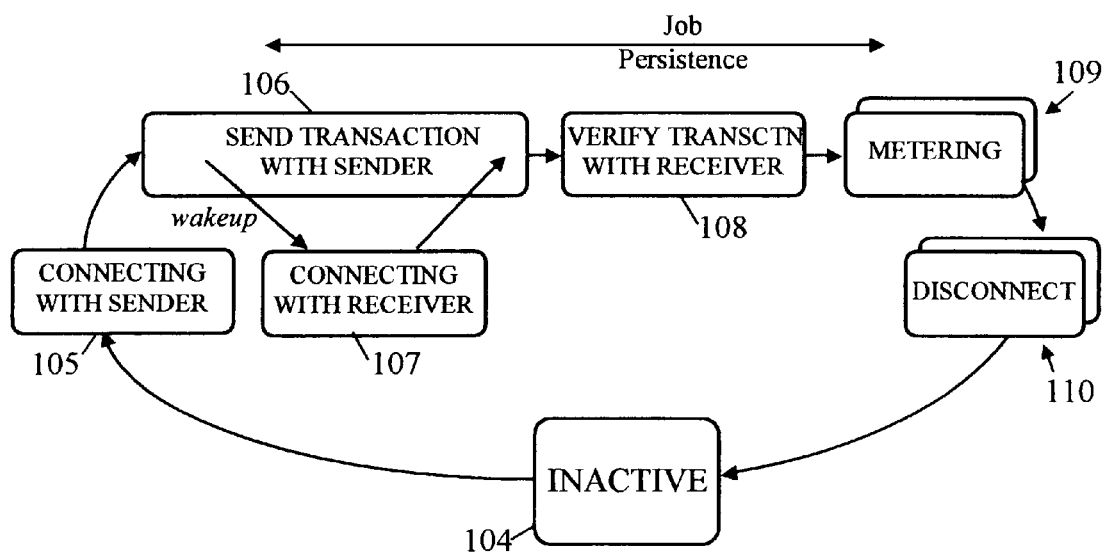
FIG. 9 is a diagram of the main operational phases of the FIG. 6 connectivity manager.

Having described individually the main elements of the connectivity manager 21, the operating phases of the connectivity manager 21 as a whole will now be described with reference to FIG. 9 in respect of a successful end-system linkup and subsequent data transfer between the systems (it should be noted that these phases are not "states" of the connectivity manager 21 as such). Starting from an inactive condition 104 (in respect of the linkup to be requested and made), the connectivity manager 21 is first contacted by the sender system and connection manager 70 confirms the setting up of a connection with the sender ("Connecting With Sender" phase 105). In due course, the sender system indicates (in a Send message) that it wishes to effect a data transfer to a specified receiver end system and the connectivity manager enters a linkup phase 106. In this phase, the send/receive manager 71 initiates a new job and, after using the lookup functionality 69 to examine the intended recipient's record, asks the CBSS 22 to wake up the intended recipient. The latter establishes (see 107) a connection with the connectivity manager 21 under the control of the connection manager 70. After this connection is set up the send/receive manager 71 is informed and it gives the go ahead to the sender system to start data transfer. The connectivity manager 21 now moves to the next phase 108 in which it verifies (or not, as the case may be) that an in-going data transfer to the receiving system is from the proper source and relates to an allocated job. Thereafter, whilst data transfer is taking place the connectivity manger is in a metering phase 109 collecting metering data from the end systems. After the final metering message is received, the send/receive manager passes the metering data to the SRMS 23 and closes down the job; the connectivity manager 21 now moves into a disconnect phase 110 in which the connection manager 71 oversees the closing of the connections with the end system.

Wakeup Signalling Arrangement

As explained above, the intended receiving end system is woken up to bring itself online by means of a wakeup call made to it over the PSTN 16 by the call-back signalling server 22. This wakeup call is recognised by the CBS monitor 48 in the receiving system CB 11B without the need for the call to be answered. This can be achieved using a value-added service such as "distinctive ringing" or Caller-ID, or by some other technique such as limited ringing (that is, ringing stops after no more than a small number of ring cycles).

Wakeup of CB 11B could be effected by means other than a wakeup call causing ringing over the telephone line 13. For example, non-ringing signalling could be used over the phone line such as is employed for the known Voice Message Waiting Indicator (VMWI) service by some PSTN operators. Another possibility is for a wakeup indicator to be transmitted over a channel independent of the telephone line; for example a radio pager could be associated with the receiving CB and used for receiving wakeup calls.

Furthermore, whilst all the wakeup call mechanisms referred to above are intended to prompt the CB to call back the CSS 20 by dialling its local NAP 18, it is possible to arrange for the NAP 18 to initiate the wakeup call passing through the local telephone network to CB 11 so that pickup of the wakeup call by CB 11 would directly provide a PSTN connection to the NAP 18. The CB could then use this telephone connection to establish a PPP session and connect through to CSS 20 without the need to make a new call.

The foregoing wakeup mechanisms are more detailed in our co-pending U.S. patent application Ser. No. 09/303,395 filed Apr. 30, 1999 incorporate herein by reference.

Overall Operation

Figure 10:
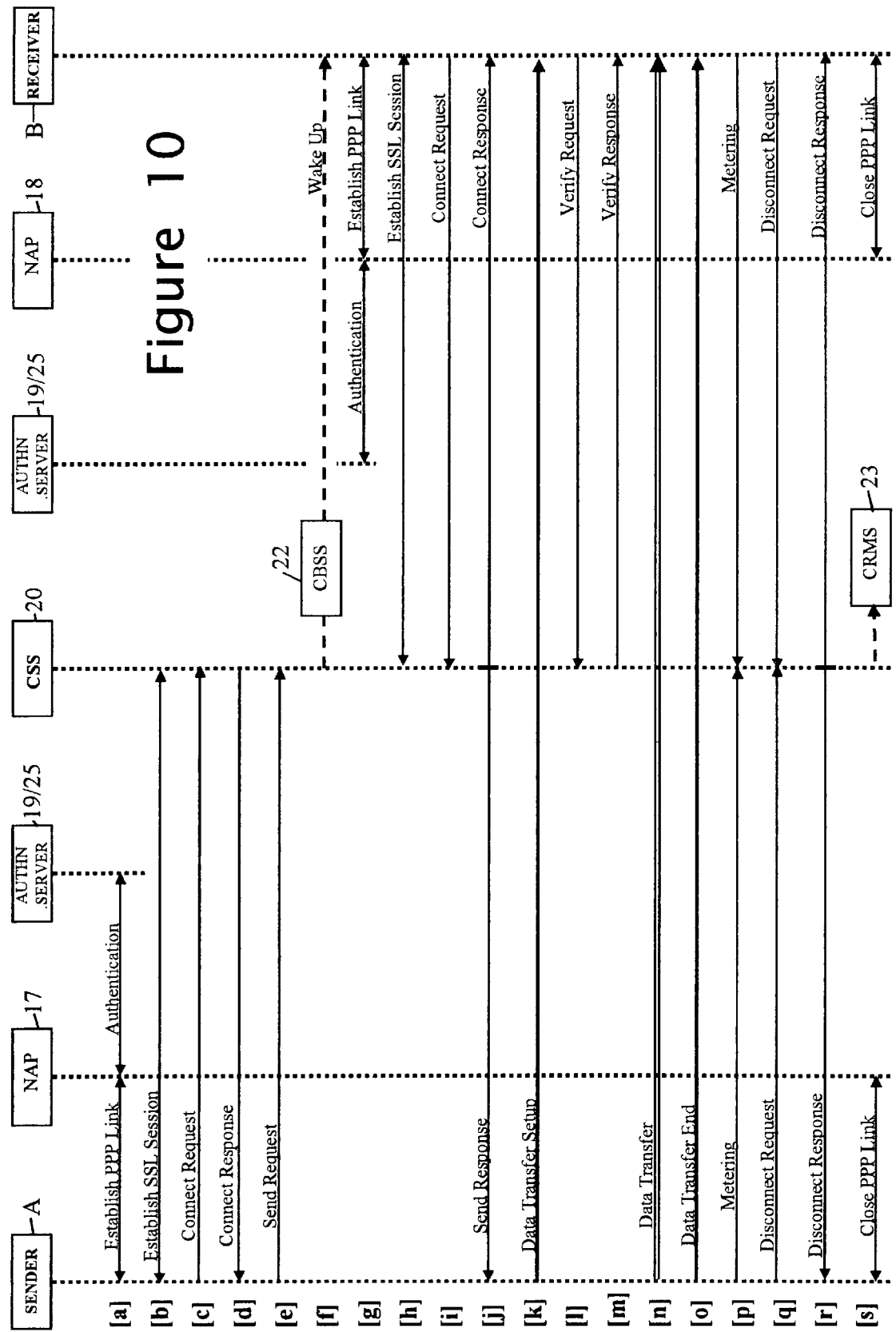
FIG. 10 is a message diagram illustrating the sequence of messages exchanged during the link-up and transfer of data between two end systems.

To conclude the description of the overall arrangement, reference is made to the message diagram of FIG. 10 that depicts the sequence of messages exchanged between components of the arrangement during the successful linkup of two end systems. This diagram shows more detail than previously given when describing the general operation of the arrangement with reference to FIG. 1; even so, not every message is shown, as will be appreciated by persons skilled in the art.

[a]13 The sending end system CB 11A, in response to user A selecting a destination party and pressing the send button on the CB 11A, calls NAP 17 and establishes a PPP link, this process being effected by the PSTN and PPP layers of protocol stack 42 and involving automatic user authentication using the user name and password stored as part of the CB parameters. Preferably, this user name has a component common to all connectivity-service subscribers, this component being recognised by the NASP authentication server 19 when it receives an authentication request from the NAP 17 and resulting in server 19 passing on the authentication request to the authentication server 25 of the CSS 20.

[b]—The TCP/IP layer of stack 42 contacts the connectivity manager 21 of CSS 20 and SSL layer of stack 42 sets up (or resumes) an SSL session with the connectivity manager 21. The handshake process involved in establishing an SSL session is well understood by persons skilled in the art and will not be described herein. During this handshake, the CB ID of CB 11A is obtained.

[c]—Connection manager 45 sends a CONNECT Request to the connectivity manager 21.

[d]—Connection manager 70 responds with a positive CONNECT Response.

[e]—Send/receive manager 46 sends a SEND Request to connectivity manager 21 including the globally-unique CB Name of the selected receiving party.

[f]—The send/receive manager 71 of connectivity manager 21 checks that the intended recipient is OK to receive a communication and initiates the making of a wakeup call by the call-back signalling server 22 to the telephone number of the intended recipient

[g]—The CBS monitor 48 of the receiving end system CB 11B recognises the wakeup call and establishes a PPP link to its local NAP 18 by a process involving authentication in the same manner as already described for end system A (see [a]).

[h]—Receiving CB 11B sets up an SSL session with the connectivity manager 21 and the CB ID of CB 11B is obtained by the latter.

[i]—Receiving CB 11B sends a CONNECT Request to connectivity manager 21.

[j]—Connectivity manager 21 responds to CB 11B with a positive CONNECT Response and, at the same time, sends a positive SEND response to CB 11A including the current IP address of CB 11B.

[k]—Data transfer protocol layer 47 of CB 11A sends a data transfer setup message directly to CB 11B.

[l]—CB 11B, on receiving the setup message, sends a VERIFY Request to the connectivity manager 21 to check that the data transfer is an authorised one.

[m]—Connectivity manager 21 replies with a positive VERIFY Response.

[n]—The data transfer from end system A to end system B is carried out. Although not illustrated, intermediate metering transactions may be effected during the course of data transfer.

[o]—The data transfer layer 47 of the sending CB 11A signals to the peer layer of the receiving CB 11B when data transfer is complete.

[p]—On termination of data transfer, the send/receive managers 46 of the end-system CBs 11 effect final METERING transactions with connectivity manager 21.

[q]—The connection mangers 45 of the end-system CBs 11 send DISCONNECT requests to the connectivity manager 21.

[r]—The connectivity manager 21 responds with positive DISCONNECT Response messages to both CBs 11.

[s]—The CBs take down their PPP links to their respective NASPs and terminate their PSTN calls. The connectivity manager 21 posts the job details to the SRMS 23.

Task Capability

The above-described embodiments of the connectivity box CB 11 and communications service system CSS 20 provide for a basic connectivity service between end-user systems. Enhanced embodiments of the CB 11 and CSS 20 will now be described in which additional services (such as address book synchronisation, and configuration and firmware updating for the CB 11) are provided in the form of tasks that are executed as and when needed.

Figure 11:
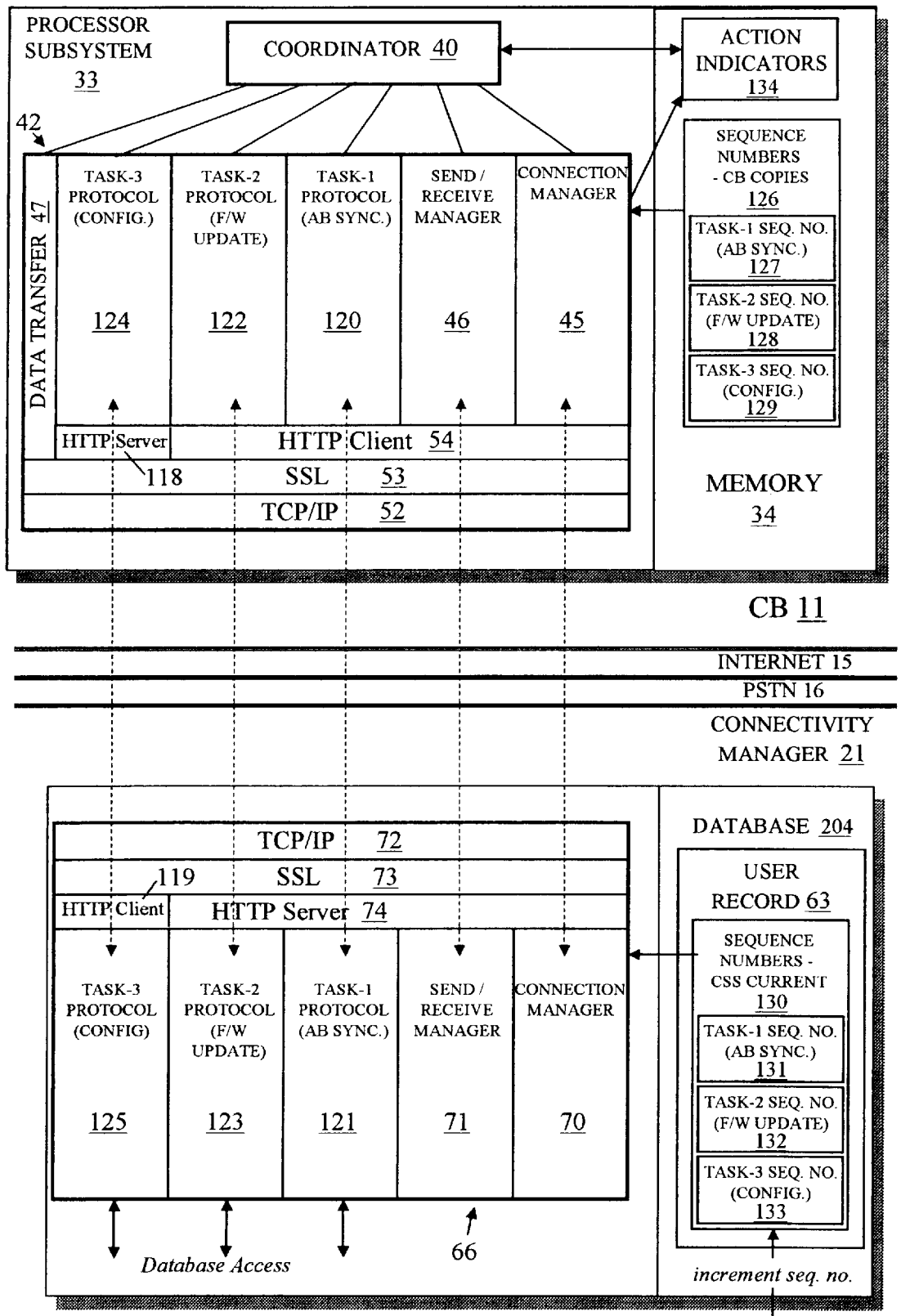
FIG. 11 is a diagram illustrating a sequence-number mechanism employed between enhanced embodiments of the FIG. 6 connectivity manager and FIG. 2 connectivity box, in order to initiate specific tasks through the use of corresponding task-specific applications protocols.

Each task is effected through complementary application-level protocol entities of the protocol stacks 42 and 68 of the CB 11 and connectivity manager 21 respectively (see FIG. 11—note that the lower layers of the protocol stacks 42 and 68 have been omitted for clarity). More particularly, the CB protocol stack 42 may include three task-specific application level protocol entities 120, 122, 124 that interact with corresponding protocol entities 121, 123, 125 of the connectivity manager 21 to effect respective tasks Task-1, Task-2 and Task 3; in the following description, these tasks are respectively address book synchronisation, CB firmware updating and CB configuration (and re-configuration). It may be noted that whilst in the CB 11 the address book synchronisation ('AB Sync') protocol entity 120 and the firmware updating ('F/W Update') protocol entity 122 both sit on top of the HTTP Client layer 54, the configuration ('Config.') protocol entity sits on top an HTTP Server layer 118; similarly, in the connectivity manager 21 whilst the AB Sync protocol entity 121 and the F/W Update protocol entity 122 both sit on top of the HTTP Server layer 74, the Config. protocol entity 125 sits on top an HTTP Client layer 119.

In terms of the FIG. 6B server-based architecture for the connectivity manager, the address book synchronisation task may be placed on the same server 201 as the Connection manager and send/receive applications whilst the configuration task and possibly also the firmware update task may be given dedicated servers.

Initiation of task execution is controlled by the coordinator 40 of CB 11 in dependence on action indicators 134 held in its memory 34. The CB 11 may set such an action indicator—for example, an AB Sync action indicator may be set upon the user making a change to the copy of the address book 35 stored in memory 34 by means of the user interface 32. An action indicator may also be set by the connectivity manager 21 through the use of a sequence number mechanism as will now be described.

This sequence-number mechanism involves both the CB 11 and connectivity manager 21 storing a sequence number related to each task. In the CB 11 these sequence numbers 126 are stored in memory 34 and in the present example embodiment comprise an AB Sync sequence number 127, a F/W Update sequence number 128, and a Config sequence number 129 (in fact, as will become clear hereinafter, this latter sequence number is only used to trigger re-configurations rather than an initial CB configuration). In the connectivity manager 21 the sequence numbers 130 are held as part of the user record 63 corresponding to the user of the CB 11 and comprise, in the present example, an AB Sync sequence number 131, a F/W Update sequence number 132, and a Config sequence number 133.

At some initial point the corresponding sequence numbers in the CB 11 and related user record 63 have identical values. Whenever the CSS 20 determines that a particular task should be executed for the CB of a given user, it increments the sequence number for the corresponding task in the user record concerned—for example, if a new firmware version is available for downloading to a CB, the CSS will increment the F/W Update sequence number 132 for the user concerned. When the CB of that user next connects, it passes the connectivity manager 21 the values of the sequence numbers 126 it holds, these values being included in the CONNECT Request message sent by the connection manager 45 of CB 11. The connection manager 70 of the CSS 20 then compares these received values with the values of the sequence numbers 130 held in the user-record concerned. If there is a discrepancy between the compared values of a particular sequence number, the user-record value of the number is returned to the CB in the CONNECT Response message sent by the connection manager 70. This tells the connection manager 45 of the CB 11 which tasks need to be executed from the point of view of the CSS and the connection manager 45 stores an appropriate indication (which may simply be the returned user-record sequence number itself) as an action indicator 134.

The coordinator 40 of a CB 11 checks the action indicators 134 at an appropriate point during its connection to the connectivity manager 21 of the CSS 20.

For example, the coordinator 40 could check for tasks such as address book synchronisation and reconfiguration at the time it is informed by the connection manager 45 that a connection has been successfully established to the CSS 20. In this case, the coordinator 40 triggers in turn each task-specific protocol corresponding to the checked-for tasks that the action indicators indicate need to be completed, the coordinator waiting for each triggered task to be completed before triggering the next. When all outstanding tasks have been done, the coordinator 40 triggers the send/receive manager 46 to carry out the send operation for which the CB 11 was brought on line. Checking for other tasks such as firmware updating may be delayed until after the send/receive manager 46 indicates that it has terminated its operation (or there is no such operation); in this case, the coordinator 40 again triggers in turn each task-specific protocol appropriate for the checked-for tasks that the action indicators indicate need to be completed. When all outstanding task have been done, the coordinator triggers the connection manager 45 to disconnect.

It will be appreciated that carrying out of the tasks can be scheduled in a manner different to that described above. For example, a sending end-system CB could check for tasks when it first connects whilst a receiving end system CB might check for tasks only after having finished its receiving operation.

The details of the operation of the task-specific protocols depend, of course, on the particular task being performed; however, in most cases there will be transfer of data from databases of the CSS 20 to the CB 11 as indicated in FIG. 11. The task-specific protocol entities at the CB 11 are also preferably made responsible for updating the corresponding CB sequence number to match that at the CSS 20. Particular task-specific protocols will be described in more detail hereinafter.

Upon a task-specific protocol entity completing its task, it signals this to the coordinator 40 with an indication of whether or not the task was successfully carried out; if the task was successfully completed the coordinator 40 clears the corresponding action indicator 134 before checking to see if another task needs to be triggered.

As well as comparing the sequence number values held by a CB 11 and those in the corresponding user record as part of the CONNECT transaction, these sequence number values can additionally or alternatively be compared as part of the DISCONNECT transaction, the manner of this comparison being the same as that described for the CONNECT transaction. In this case, the coordinator 40 may decide to execute outstanding tasks before disconnecting or go ahead with the disconnection.

It is further possible to provide a special transaction for comparing sequence number values as part of the connection protocol, this transaction being triggerable by the coordinator 40 at any time the CB 11 is connected to the CSS 20. This method of checking sequence numbers may be additional or alternative to the use of the CONNECT and/or DISCONNECT transactions.

It may be noted that in the above-described sequence number mechanism, only the CSS 20 is permitted to increment a sequence number to indicate the need for action, whereas it is only the CB 11 that triggers task execution.

Address Book Synchronisation

Figure 12:
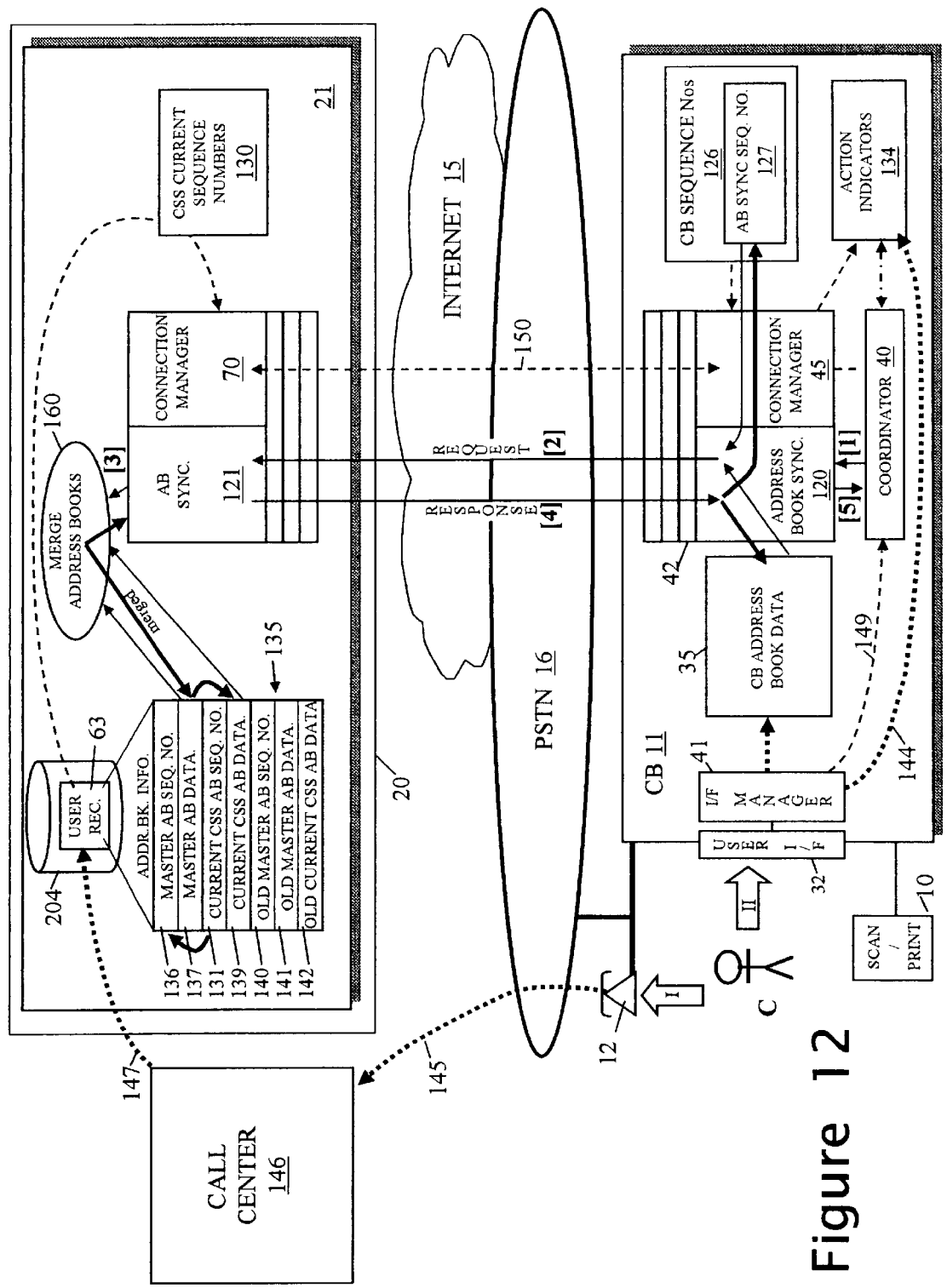
FIG. 12 is a diagram illustrating how an address book of the enhanced connectivity box is maintained with the help of an address book synchronisation task.

As already described, a copy of a user's address book is kept both in the CB 11 (CB Address book data 35—see FIG. 12) and in the CSS 20 as part of the user record 63 for the user concerned (in FIG. 12, the 'Current CSS AB Data' 139 of the address book information 135 forming part of the user record 63 held in database 204). The address book comprises the CB Name and CB Friendly name of the subscribers to which a user may wish to send data—the term "address book" is used because of its familiarity to ordinary people though in fact in the present embodiment the address book does not contain any addresses or even the contact phone numbers of the listed subscribers—the contact number being held in the record of the subscriber concerned and being located through matching of the CB Name from an address book with the CB Name of a user record.

At some point, the CB and CSS address books 35, 139 are synchronised (that is, have the same data). A user C has two ways of updating the address book:

(I) the user may use telephone 12 (or, indeed, any telephone) to place a call (dotted arrow 145) to call center 146 associated with the CSS 20 and ask an operator to update the address book; the operator, after confirming the user's identity, uses a networked computer to access (dotted arrow 147) the corresponding user record and update the Current CSS AB Data 139. This updating results in the corresponding AB Sync sequence number (the Current CSS AB Sequence Number 131 of FIG. 12) being incremented.

(II) the user may update the local copy of the address book 35 held in the CB 11 through the user interface 32 and user interface manager 41. This updating results in the setting of a corresponding action indicator 134 in the CB 11 (dotted arrow 144).

After either updating, the two copies of the address book (that held by the CSS and that held by the CB) are no longer synchronised and accordingly, one of the tasks that the CB and CSS can preferably execute in cooperation with each other is the re-synchronisation of the two copies of the address book. This is the role of the AB Sync protocol entities 120, 121 referred to above. The need for resynchronisation is known to the CB through the mechanisms already described, in particular the sequence number mechanism in the case of updating through method I above, and the direct setting of an action indicator 134 in the CB 11 in the case of updating by method II.

In order to facilitate the address book synchronisation process, the address book information 135 held in each user record comprises more that just the Current CSS AB Data 139 and the corresponding sequence number ('Current CSS AB Sequence Number' 131 in FIG. 12). More particularly, the address book information 135 further comprises copies of the address book and sequence number immediately following the last address book synchronisation (respectively 'Master AB Data' 137 and Master AB Sequence Number' 136), and a copy of the previous values of these Master quantities and of the previous current AB data (respectively 'Old master AB Data' 141, Old Master Sequence Number' 140, and Old Current CSS AB Data' 142). The 'Old' data items are held for error recovery purposes The 'Master' and 'Old' data items 136, 137, and 140–142, are only changed as part of the address book synchronisation process and not during the user-initiated address-book updating (methods I and II above).

Address Book synchronisation is effected as follows. As already described, the coordinator 40 of the CB 11 is arranged to check the action indicators 134 at some point whilst a connection is established with the CSS 20. FIG. 12 depicts the situation where the CB 11 is part of a sending end system, and user C has initiated a send operation (arrow 149) resulting in the latter triggering the connection manager 45 to establish a connection with the CSS 20. As part of connection establishment, the CB sequence numbers 126 have been passed to connection manager 70 and any mismatches with the current CSS sequence numbers 130 being determined by connection manager 70 and signalled back to the CB 11 in the manner described above. The current CSS sequence numbers 130 include the AB Sync sequence number 131 which in the case of an update having been made to the Current CSS AB Data 139 by method I above, will be different from the CB AB Sync sequence number and will result in a corresponding action indicator 134 being set in the CB. If the CB Address Book data 35 has been updated by method II, the action indicators 134 will also reflect this. It is, of course, possible for both address book update indicators to be set.

In the present example, upon completion of connection establishment, the coordinator 40 of CB 11 checks the action indicators 134 and determines that one or both copies of the address book have been updated so that the AB Sync task must be carried out. The AB Sync task is effected by the following steps:

[1]—Coordinator 40 triggers the AB Sync protocol entity 120 to effect an ABSYNC transaction.

[2]—Entity 120 sends an ABSYNC Request to the corresponding AB Sync protocol entity 121 of the connectivity manager 21. This Request includes the CB AB sequence number 127 and the CB Address Book data 35 in full.

[3]—Entity 121 first checks that the received sequence number 127 is the same as the Master AB Sequence Number 136—if it is not, an error condition is flagged. If the sequence numbers match as they should, an address book merge process 160 is run to generate a new, synchronised, address book and update the address book information 135. This merge process, which will be more fully described below, involves merging the received CB address book data and the Current CSS AB Data 139 with the Master AB Data 137 to produce the new address book which then replaces both the Master AB Data 137 and the Current CSS AB Data 139; the Master AB Sequence Number 136 is also updated to the value of the Current CSS AB Sequence Number 131.

[4]—Entity 121 sends an ABSYNC Response message to the entity 120, this message including both the new, synchronised address book which now replaces the previous CB Address Book data 35, and the Current CSS AB Sequence Number which replaces the previous CB AB sequence number 127.

[5]—Entity 120 signals the coordinator 40 that the AB Sync task has been successfully completed and the coordinator clears the relevant action indicators.

Figure 13:
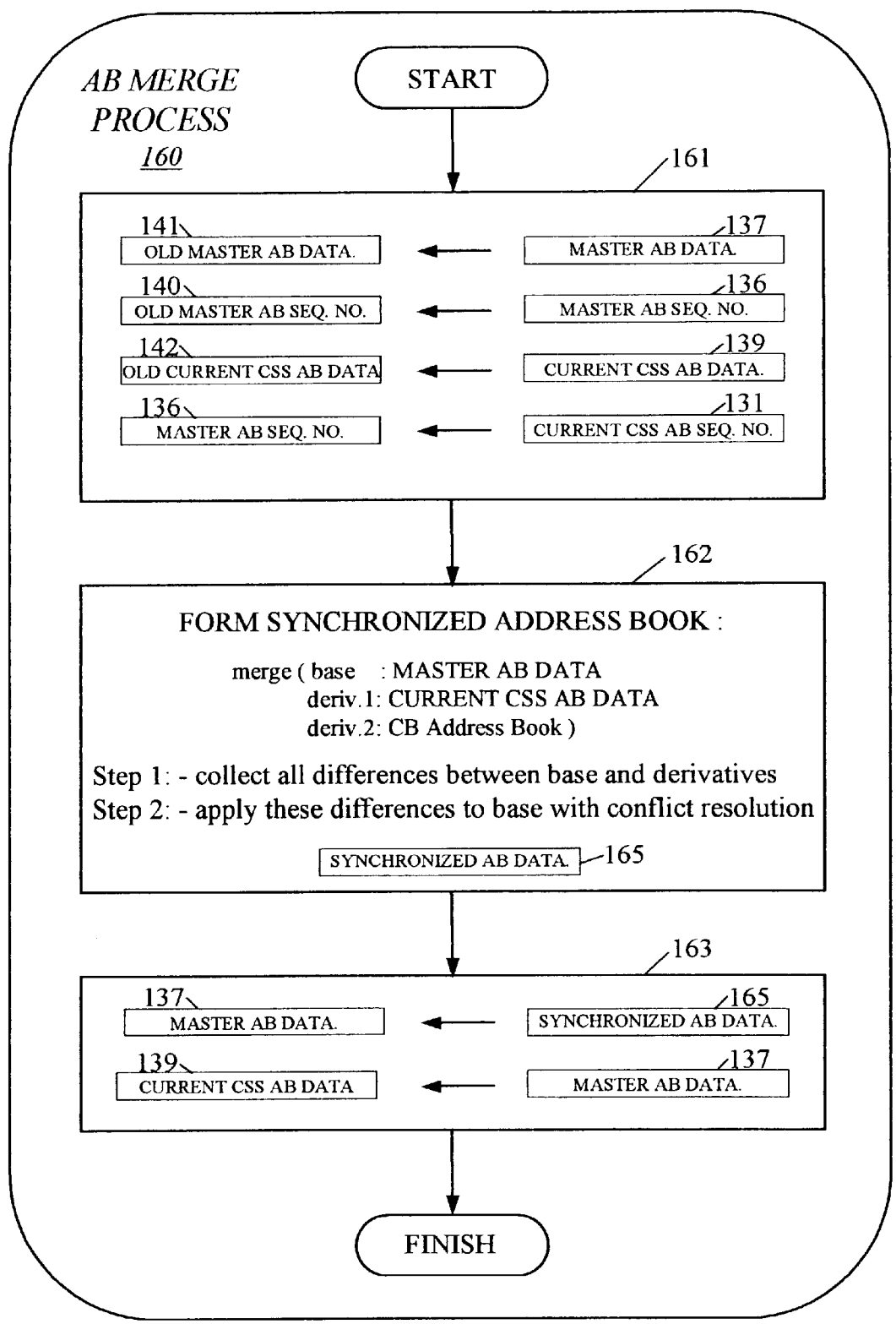
FIG. 13 is a diagram illustrating the operation of an address book merge process carried out by the connectivity manager as part of the address book synchronisation task depicted in FIG. 13.

The AB merge process 160 is depicted in FIG. 13 and comprises three phases. First (phase 161) the 'Old' data items 140–142 and the Master AB Sequence number 136 are updated as shown (and in the order shown). Next, the new synchronised address book 165 is formed by a three-way file merge using the master AB Data 137 (not yet changed) as the base file and the Current CSS AB Data and the CB Address Book 35 as derivative files (phase 162). The merge operation involves a first step of identifying all the differences between the base file and the two derivative files, and a second step of combining these differences and the base file to form the new address book, this combining being effected according to an appropriate set of rules (which, inter alia, deal with conflict resolution should this be needed). Finally, in phase 163, the contents of the newly-formed synchronised address book 165, is used to replace the previous contents of the Master AB Data 137, and the latter, newly updated, is in turn copied across as the new contents of the Current CSS AB Data 139.

A set of merge rules is given below which is suitable for the situation where updating of the address book can involve action in respect of one or more entries in any one or more of the following ways, namely:

deletion of an entry;
addition of an entry;
modification of the details of an entry;
change in position of an entry in the list of all entries.

Reference below to an "entry update" means the deletion, addition or modification of an address book entry whereas an "order update" means a change in order position of an entry; the unqualified term "update" covers both entry updates and order updates. Since updates can be made to the CB and CSS copies of the address book, it is important that the set of merge rules includes conflict resolution rules for dealing with conflicting updates.

The merge rules used during step 2 of the synchronized address book formation phase are:

1. Order updates and entry updates are treated independently of each other except that deletion of an entry negates an order update relating to that entry.
2. Every type of update operation applicable to an address book has the same priority.

3. If an entry has not been updated, the AB synchronization operation will not change that specific entry.
4. If an entry has been updated ONLY in one copy of the address book (CB copy or CSS copy) the update will be applied.
5. If the same entry has been identically updated in BOTH the CB and CSS address book copies, the update will be applied
6. If the same entry has been differently entry updated or order updated in BOTH the CB and CSS address book copies, the entry update or order update, as the case may be, made to the CSS address book takes precedence FIG. 14 shows an example address book merge operation. More particularly, FIG. 14A shows an address book which at some point forms the Master AB Data 137 and, before any updating, also the Current CSS AB Data 139 and the CB Address Book 35.

After a while, user C decides to make some updates to the Address Book which he/she does both by method I (calling the call center 146) and method II (direct entry at the CB user interface 32). FIG. 14B shows the CB and Current CSS address books 35, 139 after this updating by user C.

When the CB 11 next connects to the CSS 20 address book synchronization takes place. The first step of the synchronized address-book formation phase 162 identifies the differences between the master address book and the current CSS and CB address books; FIG. 14C lists the entry updates differences (but not the order updates). These differences and the Master Address Book are then combined to produce the new, synchronized address book shown in FIG. 14D. In forming the new address book, the following rules have been applied (the line numbers refer to the lines of the original Master address book shown in FIG. 14A):

Line 1 This line is retained unchanged because it has not been updated in either copy of the address book (rule 3);
Line 2 In line 2 the Friendly Name is altered because user C updated this name in the CSS copy via the call center 146, and the corresponding entry in the CB address book has not been altered (rule 4)
Line 3,4 These lines are inter-changed because user C changed their order in the CB Address book and there was no conflicting change to the CSS address book (rules 1, 4)
Line 5 This line is removed because it has been deleted in both the CB and CSS address books (rule 5);
Line 6 This line is removed because user C deleted it in the CB address book and there was no conflicting change to the CSS address book (rule 4);
Line 7 This line is removed because although user C modified it in the CB address book, he/she also caused it to be deleted in the CSS address book which takes precedence (rule 6).

As can be seen, in this example, two potential conflict situations arose. The first related to the entry with CB Name: XXX898; in this case, although both address books have been updated in respect of this entry, the update made is the same for both (deletion of entry) so the update is applied. The second conflict situation concerned the entry with CB Name: XXX765; in this case the CB entry had been modified whereas the CSS entry was deleted—application of rule 6 resolved the conflict giving precedence to the update made to the CSS address book—is, the entry was deleted.

In the above-described synchronisation process, the full address book from the CB 11 is sent to the CSS 20 in the ABSYNC Request; however, whilst simple to implement, this is not always necessary. Thus, if when updating the CB Address book, all updated entries (including notional deletions) are flagged, at the time of address book synchronisation, the updated entries can be readily identified and only these entries sent to the CSS. In fact, if the action indicators 134 show that changes have only been made to the Current CSS AB Data (and not to the CB address book 35), there is no need to send any address book data to the CSS 20 and no merging is required—all that is needed is for the Current CSS AB Data and sequence number to be provided back to the CB 11 (and set as the Master AB Data and sequence number 137, 136 respectively). This situation can conveniently be handled by using a different transaction to the ABSYNC transaction described above, this new transaction being the ABGET transaction made up of an ABGET Request sent from the ABSYNC protocol entity 120 to the entity 121, and an ABGET Response sent from entity 121 to entity 120 and including the full Current CSS AB Data 139 and sequence number 131.

It may be noted that it is useful to include functionality for automatically inserting into the address book of a receiving end system the details of a new sending end system that has established communication with the receiving end system (it being recalled that there is no a priori requirement that the receiving end system has the sending end system in its address book, merely that the proposed communication is within the receiver's rules—however, it would be possible to permit rules of the form that excluded all sending end systems not appearing in the receiver's address book).

CB Configuration

An important task carried out by the present embodiments of the CB 11 and CSS 20 in cooperation with each other is the initial configuration, and possible subsequent reconfiguration, of the CB 11 to set user-dependent parameters 191 (FIG. 15) such as CB Name and local NAP telephone number, user name and password. Since these parameters are user-dependent, they cannot be factory set; however, as the intended user of the CB 11 may well have no technical background at all, the (re-)configuration process needs to be, so far as practical, automatic and this can most conveniently be achieved by down-loading the user-dependent parameters over the Internet 15 from the CSS to the CSS 20.

Each CB 11 is also factory installed with a set of parameters 190 needed to operate the initial configuration process; these parameters include CB-specific data such as a unique serial number (which may be any sequence of characters, not limited to number characters), and access parameters for the configuration service of the CSS 20 (since it is not known a priori the geographic location of the initial use of the CB, access of the CB to the Internet 15 for configuration purposes is most conveniently done through a locality-independent number such as an 800 number). Whilst some of the pre-installed parameters 190 are used only during configuration/reconfiguration of the CB 11, others are used both during (re-)configuration and during normal operation of the CB along with the downloaded parameters 191.

Figure 15:
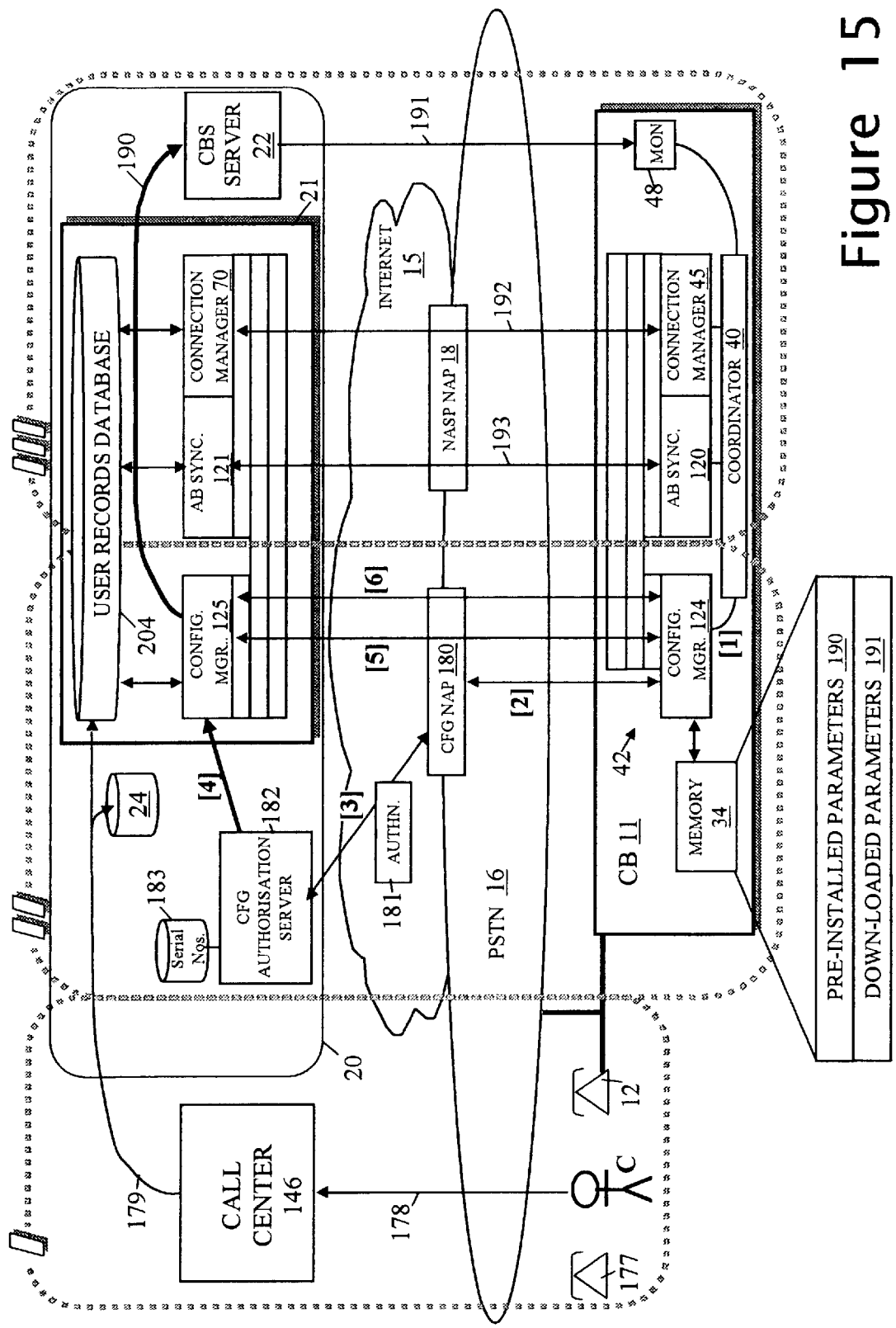
FIG. 15 is a diagram illustrating a connectivity-box configuration process that utilises a configuration protocol running between enhanced embodiments of the FIG. 6 connectivity manager and FIG. 2 connectivity box.

The configuration process comprises three phases I, II and III which, in FIG. 15, are depicted within correspondingly-marked dashed boxes. These three phases involve:

Phase I A new user C purchases a CB and calls the call center 146 to have the CB registered to the user (arrow 178). In this phase, the user gives the serial number of the CB, his/her postal address and billing details, and the telephone number for the line to which the CB will be connected. A CB Name is determined and a CB ID generated. Initial address book entries may also be decided upon. The call center operator enters the subscriber data via a network connection into databases 24, 204 (arrow 179). More particularly, the subscriber name, street address and billing data are entered in the SRMS database 24 in a new subscriber record for user C; this record also contains the CB ID of the subscriber. The subscriber operational details (CB Name, CB ID, address book, telephone number for the CB, CB serial number) are entered into a new user record 63 for user C in the connectivity-manager database 204 (arrow 179). The CB ID provides a link between the subscriber data in the two databases. The call to the call center may be made on behalf of the user by the retail outlet that sold the CB or, indeed, by the delivery service that delivers the CB to the user (this is indicated by telephone 177 in FIG. 15). Furthermore, the call need not be a voice call but could be in the form of an electronic message (for example, an e-mail or web-based form).

Phase II The user plugs in the CB 11 for the first time. The CB recognises that it is in an unconfigured state and automatically initiates a call to a configuration NAP 180 which connects through to a configuration authorisation server 182. After carrying out certain checks, the server 182 prompts the configuration protocol entity 125 of the connectivity manager 21 to connect up with the CB and download the parameters 191 to the CB. When downloading is complete, the CB terminates its connection with the connectivity manager and then disconnects from the configuration NAP 180. Phase II will be described in more detail hereinafter.

Phase III The configuration protocol entity 125 now prompts (arrow 190) the callback signalling server 22 to wakeup (arrow 191) the newly configured CB 11 to bring it back on line. The CB re-establishes a connection with the connectivity manager 21—this time through the local NASP NAP in the standard manner already described (arrow 192). The purpose of Phase III is to confirm that the configuration process has worked enabling the CB to connect to the CSS through the NAP 18. In addition, the reconnection of the CB and CSS is effective to cause an initial address book synchronisation (arrow 193), the CSS AB Sync sequence number having been set to a value different from the initialisation value of the CB AB Sync sequence number. After address book synchronisation, the CB disconnects when the timeout associated with the Connected state of the connection manager 45 expires. If the CB did not connect back to the connectivity period within a pre-set timeout period, the configuration protocol entity flags an error condition.

As an alternative to the configuration protocol entity 125 directly prompting the CBS server 22 to make a wakeup call to the CB, the entity 125 could do this via a configuration-specific skeleton version of the send/receive manager 7. This skeleton version, whilst behaving as the standard connectivity manager so far as the CBS server 22 is concerned, is not involved in a data transfer and does not need to concern itself with handling the normal protocol transactions processed by manager 71; however, it does report back to the configuration protocol entity 125 when the CB re-establishes connection to the CSS 20 or a time out expires and no connection has be established.

If subsequently it is desired to modify the downloadable parameters 191, the sequence number mechanism is used to trigger the CB to re-initiate Phase 11, with Phase III being optionally automatically carried out thereafter.

Before describing Phase II in greater depth, details of the pre-installed and downloaded parameters 190, 1991 will be given as well as an overview of the cryptographic symmetrical-key-based authentication mechanisms employed between the CB 11 and CSS.

The pre-installed parameters 190 are listed below with those parameters that are used only during (re-)configuration being shown in italics and cryptographic authentication parameters being starred:

| |
|---|
| *CFG NAP tel. no.*       } required for accessing |
| *CFG NAP user name*  } the configuration NAP |
| *CFG NAP password*   } |
| *CFG Timeouts* |
| *CB Serial No. Certificate |
| *Public key |
| *Private key |
| *Certificate for Root CA |

Note that the public/private asymmetric key pair associated with the CB11 are included amongst these parameters.

Note that the public/private asymmetric key pair associated with the CB11 are included amongst these parameters.

The parameters 191 that are downloaded during configuration of the CB 11 are as follows (again, cryptographic authentication parameters are starred):

| |
|---|
| CB Name |
| CB Friendly Name |
| *CB Certificate |
| Local NAP tel. no.     } required for accessing |
| Local NAP user name  } the NASP NAP 18 |
| Local NAP password   } |
| IP address/port no. of CSS |
| Timeouts |
| Wakeup parameters |

Asymmetric-key cryptographic techniques are used to authenticate the CB and CSS to each other. As is well known to persons skilled in the art, asymmetric key cryptography involves a public key, private key pair; the two keys are different and have the property that data encrypted using one key of the pair can only be decrypt by the other key (and not even by the encrypting key). The key pair are normally used by the owner of the keys keeping one key secret (the private key) and publishing the other key (the public key). This enables data to be sent to the key owner confidentially by encrypting the data using the owner's public key—only the key owner can read such a message as the owner is the only person with the private key. Conversely, if the key-owner sends data encrypted under the private key, whilst everyone can read it (because the public key is known), the very fact that the data is readable confirms that it was encrypted by the key owner as only the owner has access to the private key—in other words, the originator of the message has been authenticated. It is this latter property of asymmetric keys that is used in the present arrangement to authenticate the CB and CSS to each other—both the CB and CSS have their own private key/public key pair and each additionally knows the public key of the other to enable it to authenticate data supposedly sent to it from the other.

The above-outlined basic public key/private key authentication mechanism has several potential weaknesses that are handled as follows:

(i)—a critical element is the link between a public key and the identity of the corresponding key owner—unless there is a way of guaranteeing this link it is possible for an unscrupulous party to publish a public key claiming it comes from someone else and then use the corresponding private key in an attempt to convince the recipient of a message that it comes from the falsely identified party. To overcome this, digitally signed certificates issued by a trusted party (certificate authority) are used to unforgeably link the identity of the key owner with their public key, the digital signing being done using the private key of the certificate authority and in such a way that anyone with the public key of the certificate authority can confirm that the certificate is genuine and unaltered. The key owner will generally distribute this certificate when it sends out a data item encrypted under its private key—the recipient can check that the certificate is genuine using the public key of the certificate authority and may then trust the certificate to contain the correct public key for the party identified in the certificate. The recipient now uses the public key from the certificate to read the accompanying item, the ability to do so confirming that the data does indeed come from the identified party. In the present case, the CSS as well as having its own public/private key pair, also serves as a root certificate authority ("Root CA") issuing certificates for the public keys associated with the CSS and CBs, these certificates being signed with a private key of the Root CA (the "Root CA" key). These certificates issued by the CSS as the Root CA can be trusted by all subscribers to its services (after having being confirmed genuine by using the Root CA public key). To implement this arrangement, each CB contains in its pre-installed data not only its public key/private key pair, but also the certificate issued by the Root CA linking the CB public key to the identity of the CB, this identity being the unique serial number of that particular CB (this certificate is the "CB Serial No. Certificate" listed above as part of the pre-installed parameters 190). In fact this serial number certificate is only used during the configuration process and during the latter a second certificate is downloaded which links the CB public key with an identifier of the user, namely the CB ID—this is the "CB Certificate" contained in the above list of downloaded parameters 191. The CB Certificate is used for authentication purposes during normal operation of the CB. The CSS can readily check the authenticity of a CB Serial Number certificate or CB Certificate because, of course, the CSS knows the public Root CA key. Finally, to enable a CB to check the authenticity of the certificate sent to it by the CSS (purportedly holding the CSS public key), the public key of the Root CA is pre-installed in each CB as the "Certificate for Root CA" of parameters 190. In the present embodiment, the certificates used conform to the ITU-T Recommendation X.509 de facto standard.

(ii)—Whilst encrypting a data item with a private key enables a recipient in possession of the corresponding public key to confirm who encrypted the item concerned, it is possible for a third party capture the encrypted data item in transit and later replay it to the recipient to try to fool the latter into thinking that he/she is again communicating with the key owner. What is needed is a mechanism for ensuring that a current session of communication is being held with the owner of the public key for which the recipient has a certificate. This is achieved using a "challenge—response". This involves the recipient generating a random piece of data and sending it to the communicating party (this is the "challenge")—if the communicating party is truly the key owner, he/she will be able to encrypt it with the right private key and send it back (the "response") for the recipient to decrypt it with the certified public key and retrieve the original random data. If the communicating party is not the key owner, then the response will not decrypt to the original random data. This challenge—response mechanism is, in the present embodiment, provided by the co-operating SSL protocol layers 53, 73 of the CB and CSS.

(iii)—Since asymmetric cryptography is inherently computationally intensive, it is desirable to minimise its use to authentication carried out at the start of a communication exchange. Continuing assurance regarding authenticity and also of confidentiality can be achieved by using the asymmetric keys to exchange a shared secret between the parties—this secret can then be used to generate a more conventional (and less computationally intensive) symmetric encryption key—that is, a key known to both parties that serves both for encryption and decryption. In fact, normally two such keys are generated, one for each direction of transmission. Again, in the present embodiment, it is the SSL protocol layers that take care of the generation and use of the symmetric keys with new keys being generated for each session of communication between a CB and the CSS. It should be noted that the authenticity of messages exchanged under SSL after the initial challenge—response handshake can simply be guaranteed by having the transmitting entity digitally sign each message and it is not necessary to encrypt the full message to achieve this.

Returning now to a consideration of Phase II of the configuration process, this comprises the following steps:

[1]—Upon the CB being plugged into the telephone line and switched on, the coordinator 40 recognises that it is in an unconfigured state (for example, a configuration flag could be held in memory that is checked by the coordinator as part of its power on routine, this flag being set at the factory and cleared by the coordinator as the final act of the configuration process). The coordinator triggers the configuration protocol entity (configuration manager) 124 to start the configuration process. It will be appreciated that whilst the start of the configuration process could be arranged to be triggered by specific user input this is not preferred as it complicates the operation of the CB.

[2]—The configuration manager 124 initiates, through the services provided to it by the underlying PPP and PSTN protocol layers (not shown in FIG. 15), a call to the configuration NAP 180 at the telephone number contained in the preinstalled parameters 190 (for example a '800' number). When the CB is connected to the NAP 180, the CB 11 seeks to set up a PPP link and authenticate itself to the NAP using the user name and password contained in parameters 190. The user name is of the form:

"serial_number@config_domain"

where "serial_number" is the CB serial number and "config_domain" is a domain that serves to identify the log on as one for the configuration service.

[3]—The NAP 180 uses the local RADIUS server 181 for user name/password checking and the latter is set up to recognise the "config_domain" part of the user name as indicating that it should refer the matter to a configuration authorisation server 182 (also a RADIUS server). The server 182 on receiving the user name checks the serial number contained in it against a database 183 of all current legitimate serial numbers. If the serial number checks out and the password is correct, the server 182 gives the authorisation for the log on to proceed and this authorisation is passed back to the NAP 180 which now gives Internet access to CB 11. The IP address allocated by NAP 180 to the CB 11 Internet access is fed back to the server 182 (using the accounting part of the RADIUS protocol).

[4]—The configuration authorisation server 182 now passes the serial number and current IP address of the CB to the configuration manager 125 of the CSS (this can be done over a connection logically independent of the internet 15 or over the latter). The configuration manager uses the serial number to access the user record for user C, the serial number having been entered into this record as part of Phase I.

[5]—The configuration manager 125 next contacts the CB at the IP address passed to it by the server 82 and establishes a connection with the configuration manager 124. During connection establishment, the SSL protocol layers 73, 53 of the CSS and CB initiate an SSL session and in the process of doing so authenticate each other—the CB to the CSS on the basis of the serial number certificate of the CB and the CSS to the CB on the basis of the CSS certificate which the CB can check because it has the public key of the Root CA in the Root CA certificate. The SSL layers may also derive shared symmetric keys for the further exchanges during the session of interconnection of the configuration managers 124, 125.

[6]—Finally, the configuration manager 125 downloads the parameters 191 to the CB where there are stored in flash memory of memory 34. When this is done, the connection is closed and CB 11 terminates its call to the configuration NAP 180 to await a wakeup call from the CSS 20. The configuration manager 125 of the CSS 20 triggers the wakeup call after a short predetermined delay.

As has already been indicated, in the following Phase III (and, indeed, in all subsequent operational connections of the CB to the CSS), during SSL session establishment the CB identifies itself to the CSS using the CB certificate downloaded into the CB as part of the configuration process and not by using the CB serial number certificate. The CB ID contained in the CB Certificate and extracted during SSL session establishment, is subsequently used during operation of the CSS connection manager 70 and send/receive manager 71 to access the appropriate user record 63.

As previously noted in discussing FIG. 11, for the configuration protocol entities it is the CSS side which is the HTTP client and the CB side the HTTP server; the reason for doing this is to facilitate security of the configuration manager 125. It is, of course, possible, though not preferred, to have the CSS side as the HTTP server and the CB side as the HTTP client; in this case, in step [5] of Phase II the CB would initiate contact over the internet 15 with the configuration manager 125 and it would not be necessary to have the authorisation server 182 pass the temporary IP address of the CB to the manager 125 (though it would, instead, be necessary to make the address of the connectivity manager 21 available to the CB—for example, by including this address in the pre-installed parameters 190).

During the lifetime of the CB, it may become necessary to reconfigure the CB, for example, due to a change of address of the user calling for access to a different NASP NAP or due to the operator of the CSS changing NASP. New configuration parameters 191 must then be downloaded from the configuration manager and generally it will be the CSS which will determine when a re-configuration is ready to be effected (this is true even in the case where the change prompting the need for reconfiguration results from a user action—such as moving house—since the details of the change will generally be communicated to the call center 146 resulting in the user record being updated and new parameters 191 being derived if necessary).

As already explained, the CSS signals to the CB that a reconfiguration task should be effected by incrementing the reconfiguration sequence number 133 (see FIG. 11), the discrepancy between this number and the corresponding sequence number 129 of the CB being noted when the CB next contacts the CSS and resulting in the configuration action indicator 134 being set in the CB. The CB is responsive to the setting of this action indicator to contact the configuration manager 125 to download the new parameters 191 after which it increments its configuration sequence number 129 to match that of the CSS.

A number of options are possible in the implementation of the reconfiguration process. More particularly, whilst the CSS could simple wait until the CB next contacts it for the reconfiguration task to be effected, it may be more appropriate for the reconfiguration process to be effected as soon as possible and in this case the CB is prompted to contact the CSS by arranging for the CBS server to place wakeup call to the CB. The choice as to whether or not the CB should be woken up in this manner can be left to the call center agent who enters changed user details and/or to the CSS operator when the latter is responsible for the change that requires new parameters 191 to be downloaded.

Another possible option is whether the CB uses the configuration NAP 180 or the NASP NAP 18 for contacting the configuration manager. One reason to provide this as an option is that access through the configuration NAP 180 will generally be at no charge to the user (the call time being paid for by the CSS operator) whereas access through the NASP NAP 18 will generally be paid for by the user. It may therefore be desirable to have reconfigurations caused by the operator effected through the configuration NAP 181 and reconfigurations caused by the user effected through the NASP NAP 18. The CSS can signal to the CB which NAP is to be used by adjusting the size of increment applied to the configuration sequence number 133 (for example, an increment of "1" means that access should be through the configuration NAP 180 whereas an increment of "2" means that the NASP NAP should be used). Thus, where the sequence number 133 is incremented by "1", the CB on becoming aware of this increment when next communicating with the CSS through NASP NAP 18, will terminate its communication with the CSS through this NAP and contact the configuration manager 125 through the configuration NAP 180. In contrast, if the configuration sequence number is incremented by "2", the CB can maintain its use of NASP NAP to contact the configuration manager.

It is useful also to arrange for the CB itself to be able to initiate reconfiguration through the configuration NAP 180. For example, where the CB detects corruption of the parameters 191 or where the CB is unable to contact the CSS through the NAP 18 after several attempts spaced in time, then it may be appropriate to arrange for the CB to automatically initiate a reconfiguration operation with a view to obtaining a working set of parameters 191.

Variants

Many variants are possible to the above-described embodiment of the invention, some of which are noted below.

Thus, whilst it is envisaged that the sending and receiving end systems will generally both have internet access through dial-up connections, the sending system could have more direct access (for example, it could be connected to a enterprise LAN that connects to the internet through a firewall); in this case, the basic operation of the communications service system and of the receiving end system are substantially the same as already described.

Furthermore, it is possible for the sending system to send to a selected distribution list (that is, to multiple receiving systems rather than just one); to accommodate this, the address books in both the CB and CSS would need to hold such lists in a manner enabling their individual identification so that the CB can tell the connectivity manager the list to be sent to, the connectivity manager thereafter controlling connection set up accordingly. This assumes that it is the connectivity manager that is responsible for processing the distribution list—it is alternatively possible for the CB to be solely responsible for the list, asking the connectivity manager to wake up each intended recipient. The actual transmission to multiple destinations can be effected using a multicasting technique.

With regard to how the current IP address of one end system is passed to the other, in the described embodiment the connectivity manager passes the receiving end system IP address to the sending end system in the SEND response message. However, it would be possible to operate otherwise; for example, the receiving end system could be told the IP address of the sending system by the connectivity manager and it then becomes the responsibility of the receiving end system to contact the sending system.

Whilst authentication of subscribers on connection to their local NAP is highly desirable, it is not, of course, essential. The same is true of the security surrounding the connections established between the end systems and the CSS 20.

The setting up of an SSL session between a CB 11 and the connectivity manager 21 involves a substantial processing and handshake messaging overhead if done ab initio with the creation and sharing of a master secret. Accordingly, rather than repeating this process for each connection established between a CB 111 and manager 21, the same master secret can be re-used repeatedly, the SSL session being resumed, with a much shorter handshake, at each connection rather than started anew.

Furthermore, since the process of establishing an SSL session (whether a new one or a resumed one) involves a CB 11 establishing its identity, in the form of its user's globally-unique CB Name, with the connectivity manager 21, this name need not be included in the CONNECT Request message.

The CB 11 is shown as connected off the subscriber line 13 in the conventional way of adding equipment to the line. However, there are some advantages to be gained in interposing the CB between the line entry to the receiving end system and the other equipment connected to the line. In this case, the CBS monitor would only pass on ringing after the first two (more generally R) rings—that is, only if it determines that the incoming call is not a wakeup call. With such an arrangement, the first two rings are not heard by the user who is therefore not disturbed at all by the wakeup calls sent to the CB.

With regard to the configuration process, in the above-described embodiment the user record was accessed in step [4] of Phase II on basis of the serial number of the CB as passed to the configuration manager 125 by the authorisation server 182. In fact, it is possible to defer record access until after the serial number supplied by the CB in its serial number certificate has been authenticated in step 5; in this latter case, it is clearly unnecessary for the server 182 to pass the serial number to the configuration manager for the purpose of accessing the user record. Note, however, that if the serial number is not passed by the server 182, then there could be a mismatch between the serial number as checked by the authorisation server against the list of valid numbers, and the serial number authenticated by the configuration manager in step [5]; the risk of such a mismatch may be acceptable but if it isn't then the serial number needs to be passed from the authorisation server to the configuration manager and checked against the serial number authenticated in step [5] or, alternatively, the configuration manager could access database 183 and itself check the authenticated serial number against the list of valid numbers.

It may also be noted that if security is not a major concern then the whole process of cryptographic authentication of the CB in terms of its serial number can be avoided and the serial number (however passed to the configuration manager 125) can be directly used to access the corresponding user record; this is not, however, a preferred arrangement.

It is possible to arrange for the authorisation server to pass other information to the configuration server additional or alternatively to the CB serial number and temporary IP address. For example, the telephone number of the CB could be passed to the configuration manager by the authorisation server 182, the latter receiving this number from the configuration NAP 180 that extracted this number from caller-id information it received when servicing the call from the CB. This telephone number can then be added to the user data held in database 204 thereby doing away with the need to obtain this information during Phase I (this has the advantage of eliminating a source of error since a user may actually plug the CB into a telephone connection with a number different to that given in Phase I. Alternatively, where the telephone number has been taken and recorded in Phase I, passing the number to the configuration manager in step [4] of Phase II enables the configuration manager to look up the relevant user record using the number as a search key rather than the CB serial number.

The computer records that hold the user data in databases 24 and 204 may be implemented by any suitable data structures and no limitations should be read into the term "record" as used herein.

What is claimed is:

1. A communications arrangement comprising:

a communications infrastructure including a data network and access network means providing connection to the data network through data-network access points;

a plurality of end systems connected to the access network means, and a service system connected to the data network for facilitating communication between the end systems over the data network via the access network means and data-network access points;

the plurality of end systems including:

a first end system comprising an image sending device, and a first connectivity entity connected to the image sending device and said access network means for establishing, in cooperation with a corresponding entity in a selected receiving end system, a connection passing through the data network for the image sending device to send an image to the selected receiving end system, the first connectivity entity including request means for sending a request to the service system to facilitate the establishment of communication between the first end system and the selected end system; and a second end system comprising an image receiving device and a second connectivity entity connected to the image receiving device and said access network means for establishing, in cooperation with a corresponding entity in a sending end system, a connection passing through the communications infrastructure for the image receiving device to receive an image from the sending end system, the second connectivity entity including response means for responding to a wakeup indicator received from the service system by connecting to the data network and communicating with the service system;

the service system including first means responsive to a said request from the first end system indicating that it wishes to communicate with the second end system, to send a wakeup indicator to the second end system, and second means responsive to being contacted by the second end system as a result of receiving said wakeup indicator, for enabling the first and second end systems to communicate directly with each other across the data network.

2. An arrangement according to claim 1, wherein at least the second of said end systems is operative to connect to the data network through a data-network access point that includes means for allocating the end system an address on the data network that is independently assigned each time connection to the network is established; the connectivity entity of at least one of said first and second end systems including address-passing means for passing to the service system the current data-network address network of the end system concerned; and the said second means of the service system having means for passing from the service system, over the network, to one of said first and second end systems, the network address of the other end system.

3. An arrangement according to claim 2, wherein the connectivity entities of the first and second end system include respective said address-passing means, and the second means of the service system is operative to pass the data-network address of the second end system to the first end system and the data-network address of the first end system to the second end system.

4. An arrangement according to claim 1, wherein the connectivity entity of the first end system includes addressee book means for storing addressee identifiers and enabling user-selection of a desired end system, designated by a corresponding addressee identifier, to which to send an image, the request means of the first end system being operative to send the addressee identity of a selected end system to the service system as part of a said request; and the service system having database means for storing wakeup contact data for at least some of said end systems as identified by said addressee identifiers, the said first means of the service system using the database means to determine the wakeup contact data of an end system identified in a said request by a said addressee identifier whereby to enable a wakeup indicator to be sent to that end system.

5. An arrangement according to claim 4, wherein said addressee identifiers are used specified and said database means comprises for each sending end system a respective association of addressee identifiers to end-system wakeup contact data.

6. An arrangement according to claim 1, wherein the connectivity entity of at least one of said first and second end systems includes metering means for metering the transfer of image data between the first and second end systems, the metering means being operative to periodically send a metering message to the service system during the course of the image data transfer; the service system including means for receiving and collating said metering messages.

7. An arrangement according to claim 1, wherein the connectivity entity of each of said first and second end systems includes metering means for metering the transfer of image data between the first and second end systems, the metering means being operative to send at least one metering message to the service system in respect of the transfer of image data from the first end system to the second end system; the service system including means for receiving and collating said metering messages.

8. An arrangement according to claim 7, wherein the metering means of each of the first and second end systems periodically sends a metering message to the service system throughout the course of the image data transfer between the first and second end systems.

9. An arrangement according to claim 6, wherein the connectivity entities of the first and second end systems each maintain a permanent connection with said service system during the transfer of image data between the end systems, said metering messages being passed over these connections.

10. An arrangement according to claim 9, wherein the connectivity entities and the service system include cooperating encryption-based authentication means for authenticating the end systems and service system to each other for the passing of metering messages therebetween.

11. An arrangement according to claim 1, wherein the second means of the service system includes means for informing the first end system of the connection of the second end system to the data network, the connectivity entity of the first end system being operative to thereupon contact the second end system and pass it a transfer-operation characteristic known also to the service system in respect of the intended image data transfer, and the connectivity entity of the second end system including verify means responsive to a said end system contacting the second end system and passing it a said transfer-operation characteristic, to communicate with the service system to check that the said transfer-operation characteristic received by the second end system corresponds to that known to the service system in respect of the expected image data transfer to the second end system, the service system including complementary verify means for cooperating with the verify means of the second end system to check said transfer-operation characteristic, the verify means of the second end system only permitting data transfer to proceed where said transfer-operation characteristic checks out.

12. An arrangement according to claim 11, wherein the said first end system is operative to connect to the data network through a data-network access point that includes means for allocating the end system an address on the data network that is independently assigned each time connection to the network is established; the connectivity entity of the first end system including address-passing means for passing to the service system the current data-network address network of the first end system, this address serving as the transfer-operation characteristic checked by the cooperating verify means of the second end system and service system.

13. An arrangement according to claim 11, wherein said service system includes means for assigning a job identity to an intended image data transfer between the first and second end systems notified to the service system in a said request from the first end system, the second means of the service system passing this job identity to the first end system and the job identity serving as said transfer-operation characteristic checked by the cooperating verify means of the second end system and service system.

14. An arrangement according to claim 1, wherein the first and second end systems each include means for passing authentication data to the service system to identify and authenticate themselves to the service system, the service system including checking means for using the authentication data passed to the service system from the first and second end systems to identify and authenticate both end systems and check that they are both registered users of the service system, the checking means being operative to inhibit operation of said second means of the service system unless both the first and second end systems are authenticated as registered users.

15. A method of initiating communication over a data network between a first end system and a second end system using the services of an intermediary system connected to the network at a known address, at least the second of said end systems being connectable to the network through a network access service that provides access to the network for that end system with an address that is independently assigned each time connection to the network is established; said method comprising the steps of:

(a)—passing from the first end system, over the network, to said intermediary system, a network address through which the first end system can be contacted, (b)—passing from the first end system, over the network, to said intermediary system, an indication that the first end system wishes to communicate with the second end system;

(c)—in response to receipt of said indication at said intermediary system, sending a wake-up indicator to the second end system;

(d)—in response to receipt of the wake-up indicator at the second end system, establishing a data connection between the second end system and the intermediary system through said network access service, and informing the intermediary system of the network address of the second end system; and (e)—passing from the intermediary system, over the network, to one said end system, the network address of the other said end system, and passing the network address of said one end system, from said one end system or said intermediary system to the said other end system whereby the end systems, knowing each others network addresses, can inter-communicate.

* * * * *